US012632154B2

(12) United States Patent
Kano et al.

(10) Patent No.: US 12,632,154 B2
(45) Date of Patent: May 19, 2026

(54) SENSOR MODULE, TOUCH PANEL, AND ELECTRONIC DEVICE

(71) Applicant: Murata Manufacturing Co., Ltd., Nagaokakyo (JP)

(72) Inventors: Hidekazu Kano, Nagaokakyo (JP); Yuuki Tachibana, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/194,150

(22) Filed: Apr. 30, 2025

(65) Prior Publication Data

US 2025/0258573 A1 Aug. 14, 2025

Related U.S. Application Data

(63) Continuation of application No. PCT/JP2023/039277, filed on Oct. 31, 2023.

(30) Foreign Application Priority Data

Nov. 14, 2022 (JP) ................................. 2022-181684

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 2203/04105* (2013.01)

(58) Field of Classification Search
None
See application file for complete search history.

(56) References Cited

U.S. PATENT DOCUMENTS 9,690,414 B2 6/2017 Kano et al.
10,101,866 B2 10/2018 Kano et al.
(Continued)

FOREIGN PATENT DOCUMENTS

JP 2016-184425 A 10/2016
JP 2019-125083 A 7/2019
(Continued)

OTHER PUBLICATIONS

International Search Report received for PCT Patent Application No. PCT/JP2023/039277, mailed on Jan. 16, 2024, 2 pages (English translation only).

*Primary Examiner* — Christopher J Kohlman
(74) *Attorney, Agent, or Firm* — ArentFox Schiff LLP

(57) ABSTRACT

A sensor module including: a piezoelectric sensor having a piezoelectric film, one or more first electrodes, and one or more second electrodes; and a touch sensor having a plurality of transmission electrodes and a plurality of reception electrodes, wherein the elastic member, the piezoelectric sensor, and the touch sensor are arranged in this order in a negative direction of a Z axis, the plurality of transmission electrodes include a plurality of first non-overlapping portions that do not overlap the plurality of reception electrodes in a Z axis direction, the plurality of reception electrodes include a plurality of second non-overlapping portions that do not overlap the plurality of transmission electrodes in the Z axis direction, and the plurality of first non-overlapping portions or the plurality of second non-overlapping portions do not overlap the one or more first electrodes and the one or more second electrodes in the Z axis direction.

19 Claims, 14 Drawing Sheets

(56) References Cited

U.S. PATENT DOCUMENTS

| | | | |
|---|---|---|---|
| 10,466,827 B2 | 11/2019 | Ando et al. | |
| 2015/0331517 A1 | 11/2015 | Filiz et al. | |
| 2015/0378493 A1 | 12/2015 | Kano et al. | |
| 2016/0195971 A1 | 7/2016 | Ando et al. | |
| 2016/0306481 A1* | 10/2016 | Filiz | G01L 1/144 |
| 2017/0242510 A1 | 8/2017 | Kano et al. | |
| 2022/0147187 A1* | 5/2022 | Tsangarides | G06F 3/0446 |

FOREIGN PATENT DOCUMENTS

| | | | |
|---|---|---|---|
| WO | 2015/041130 A1 | 3/2015 | |
| WO | 2015/050097 A1 | 4/2015 | |

* cited by examiner

SENSOR MODULE, TOUCH PANEL, AND ELECTRONIC DEVICE

CROSS REFERENCE TO RELATED APPLICATIONS

The present application is a continuation of International application No. PCT/JP2023/039277, filed Oct. 31, 2023, which claims priority to Japanese Patent Application No. 2022-181684, filed Nov. 14, 2022, the entire contents of each of which are incorporated herein by reference.

TECHNICAL FIELD

The present disclosure relates to a sensor module including a sensor that detects deformation of a member.

BACKGROUND ART

Patent Document 1 describes a touch sensor including a housing, a plate, a press detecting sensor, and a position detecting sensor. The position detecting sensor, the press detecting sensor, and the plate are arranged in this order in a positive direction of a Z axis. Outer peripheral ends of the plate, the press detecting sensor, and the position detecting sensor are fixed to the housing. The position detecting sensor detects a position touched by a user on the plate.

The press detecting sensor detects a force applied to the plate by the user. The press detecting sensor includes a piezoelectric film, a first piezoelectric detection electrode, and a second piezoelectric detection electrode. The piezoelectric film is located between the first piezoelectric detection electrode and the second piezoelectric detection electrode. Each of the first piezoelectric detection electrode and the second piezoelectric detection electrode has an annular shape as viewed in a thickness direction of the touch sensor. Each of the first piezoelectric detection electrode and the second piezoelectric detection electrode is provided at an outer peripheral edge portion of the plate.

Patent Document 1: Japanese Patent Application Laid-Open No. 2016-184425

SUMMARY OF THE DISCLOSURE

In a field of the touch sensor described in Patent Document 1, it is desired that a sensor which detects deformation of a member easily detects the deformation of the member.

An object of the present disclosure is to provide a sensor module in which a sensor which detects deformation of a member easily detects the deformation of the member.

A sensor module according to an embodiment of the present disclosure includes: an elastic member; a piezoelectric sensor which includes a piezoelectric film, one or more first electrodes, and one or more second electrodes; and a touch sensor which includes a plurality of transmission electrodes and a plurality of reception electrodes, the elastic member, the piezoelectric sensor, and the touch sensor are arranged in this order in a negative direction of a Z axis, each of the one or more first electrodes are on a positive side of the Z axis with respect to the piezoelectric film, each of the one or more second electrodes are on a negative side of the Z axis with respect to the piezoelectric film, the piezoelectric sensor is constructed to output a first signal when the elastic member is deformed, each of the plurality of transmission electrodes are on the negative side of the Z axis with respect to the plurality of reception electrodes, the touch sensor is constructed to output a second signal on the basis of a capacitance value when a capacitance is generated between the plurality of transmission electrodes and the plurality of reception electrodes, the plurality of transmission electrodes include a plurality of first non-overlapping portions that do not overlap the plurality of reception electrodes as viewed in a Z axis direction, the plurality of reception electrodes include a plurality of second non-overlapping portions that do not overlap the plurality of transmission electrodes as viewed in the Z axis direction, and the plurality of first non-overlapping portions or the plurality of second non-overlapping portions do not overlap the one or more first electrodes and the one or more second electrodes as viewed in the Z axis direction.

According to the sensor module according to the embodiment of the present disclosure, the sensor which detects deformation of a member easily detects the deformation of the member.

BRIEF EXPLANATION OF THE DRAWINGS

FIG. 1 is an exploded perspective view of a sensor module 1.

FIG. 9 is a view illustrating a case where the user 200 touches the elastic member 10 included in the sensor module 1a.

DETAILED DESCRIPTION

First Embodiment

Figure 1:
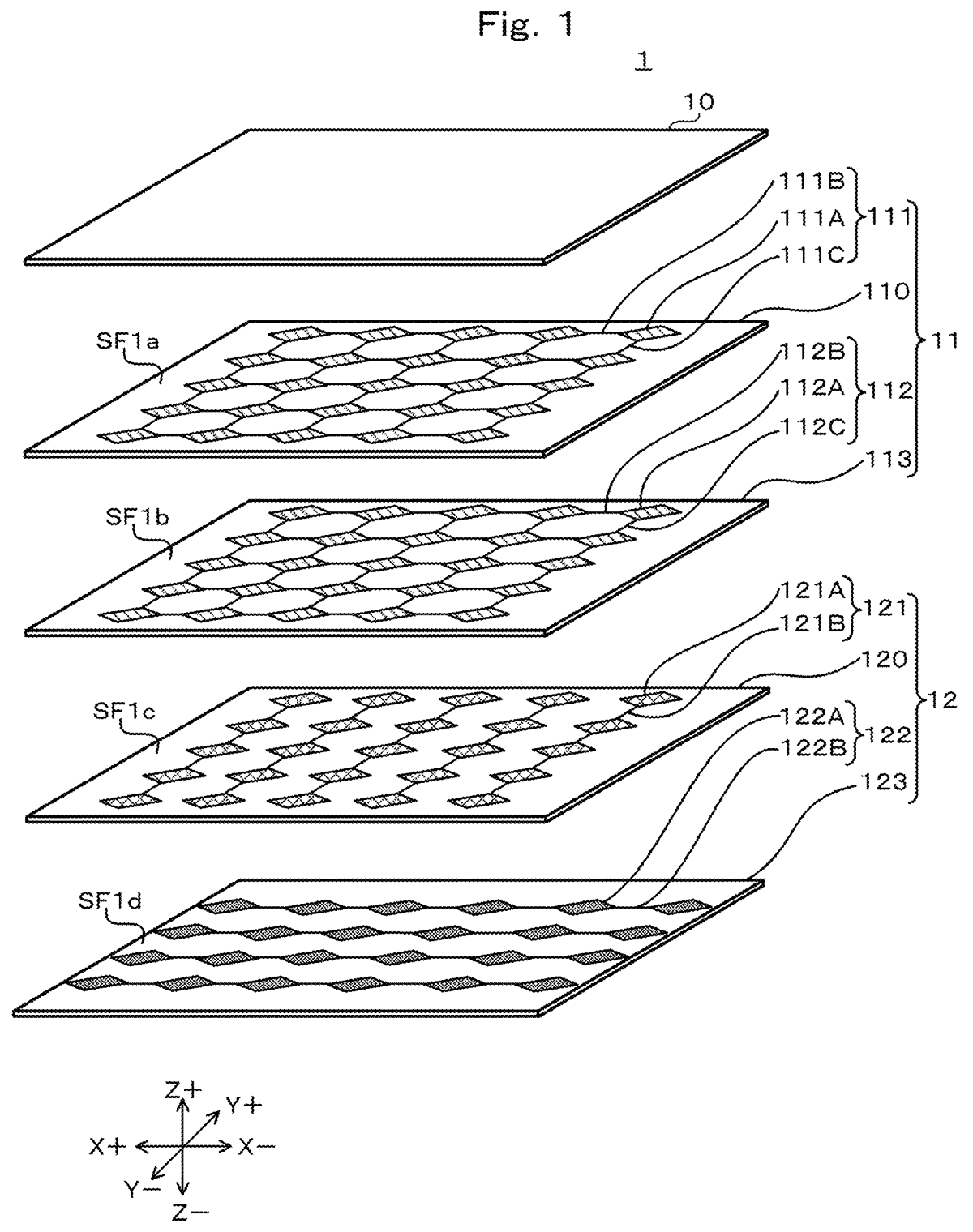
Figure 2:
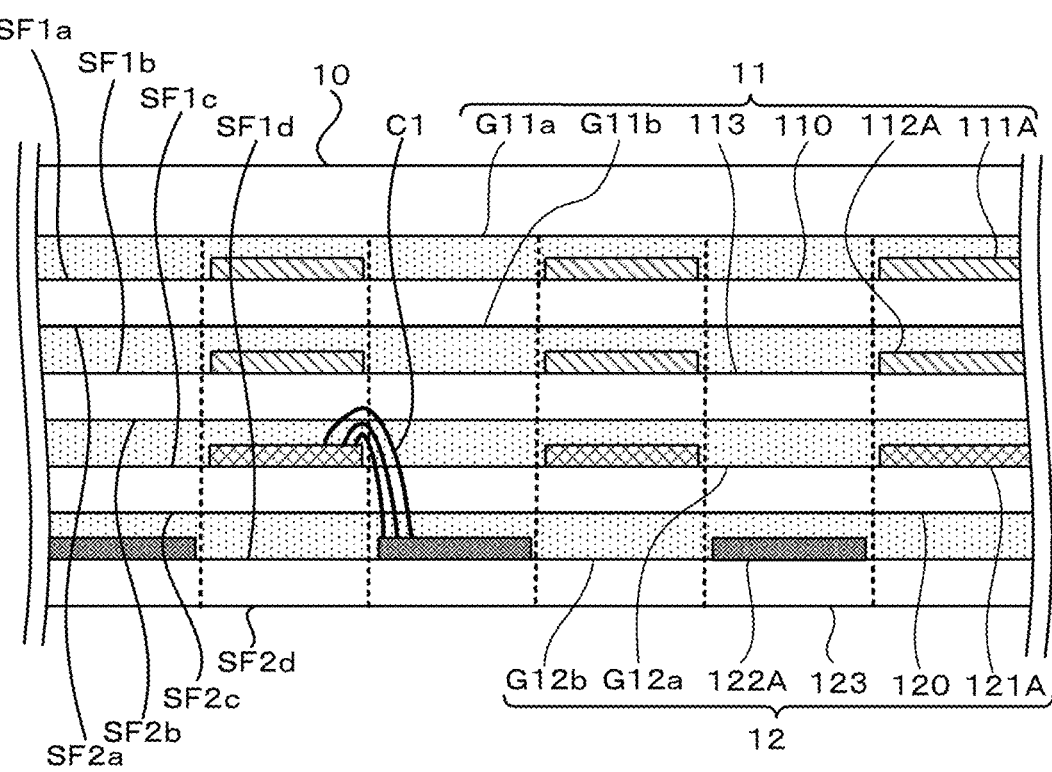
FIG. 2 is a perspective view of the sensor module 1 as viewed in a positive direction of a Y axis.
Figure 2:
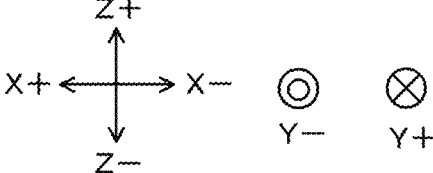
Figure 3:
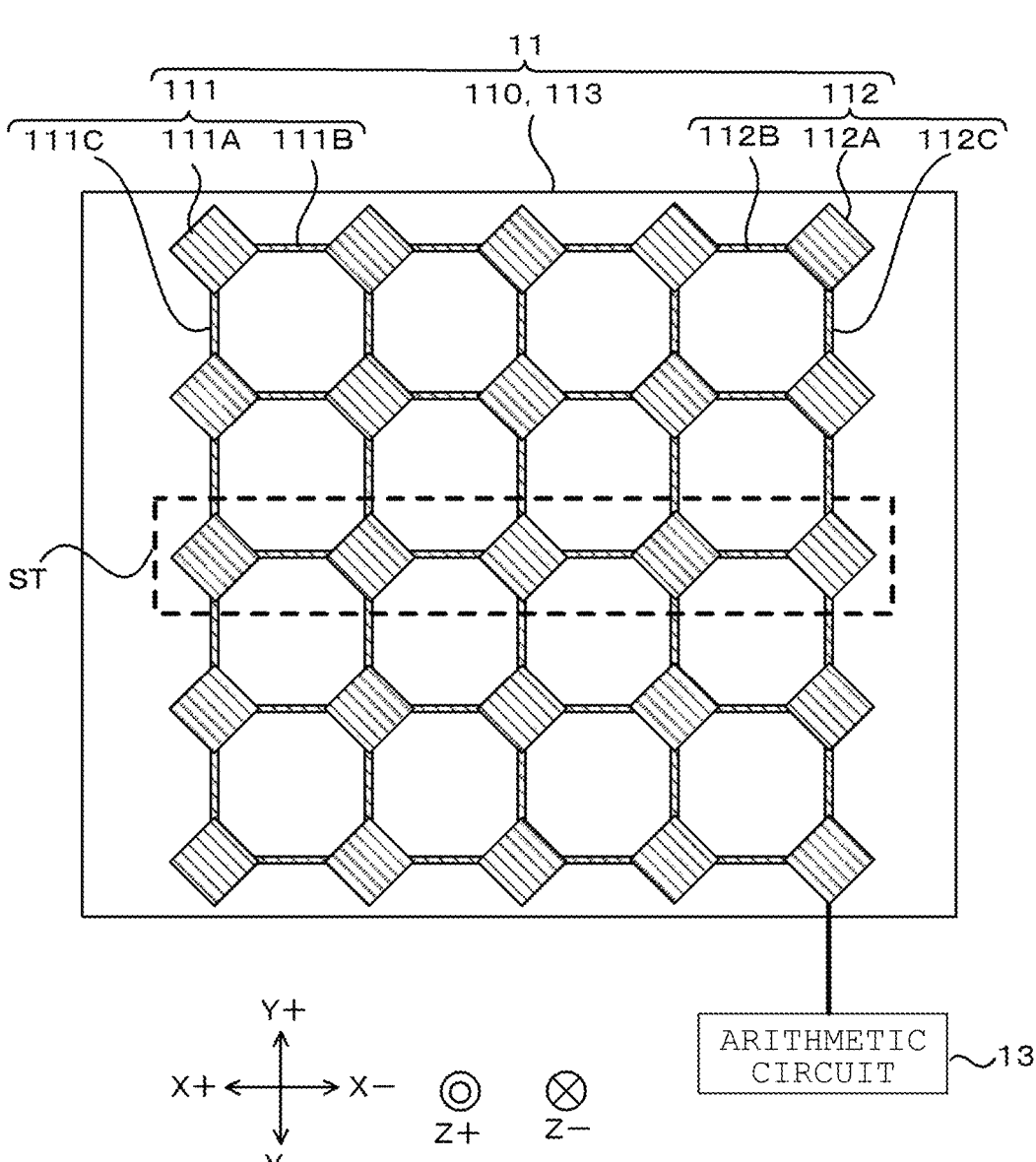
FIG. 3 is a view of a piezoelectric sensor 11 as viewed in a negative direction of a Z axis.
Figure 4:
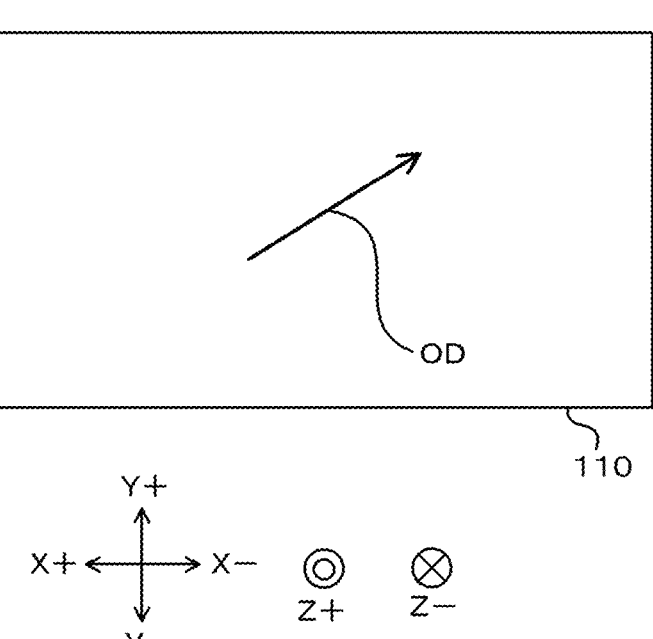
FIG. 4 is a view of a piezoelectric film 110 as viewed in the negative direction of the Z axis.
Figure 5:
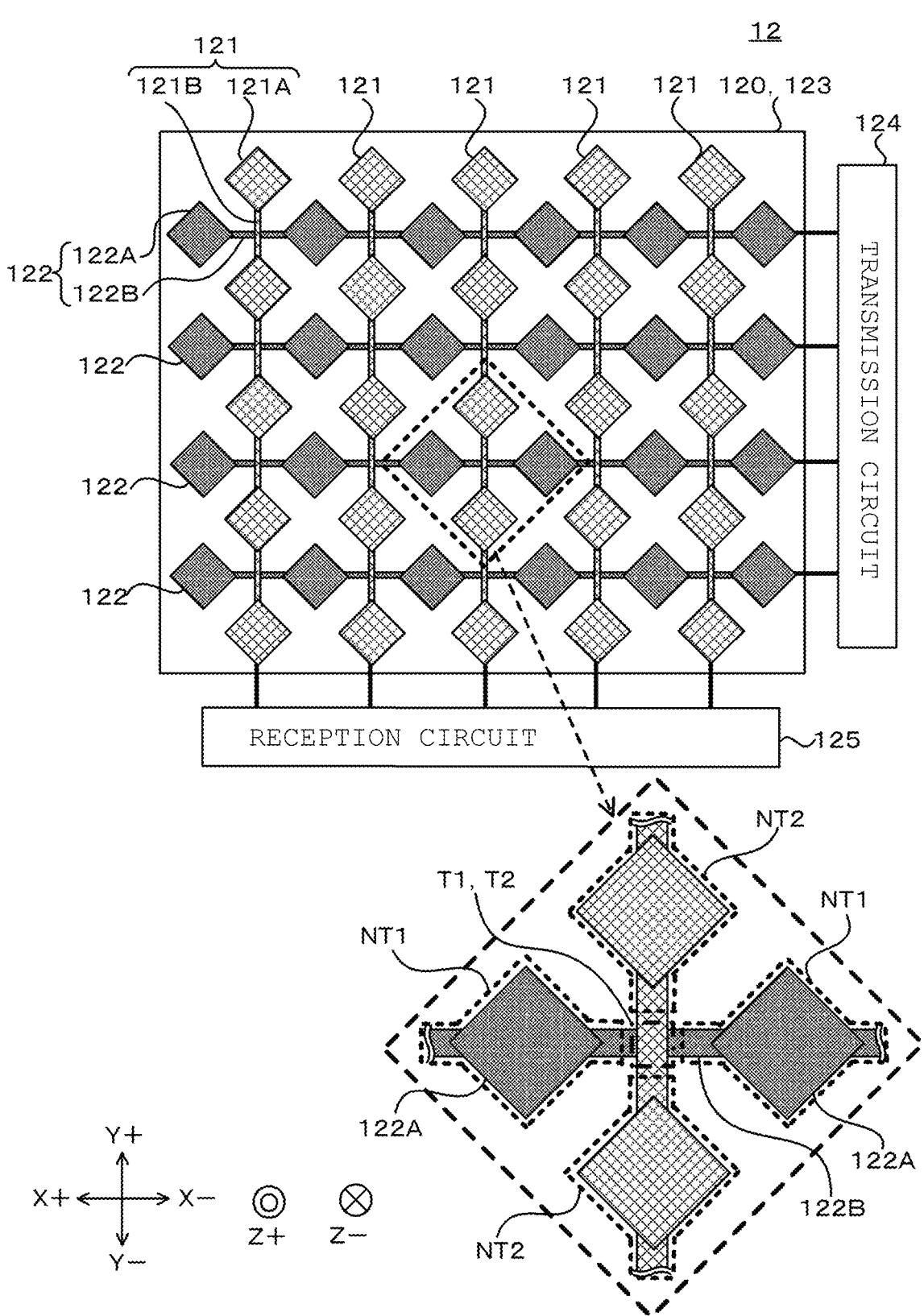
FIG. 5 is a view of a touch sensor 12 as viewed in the negative direction of the Z axis.
Figure 6:
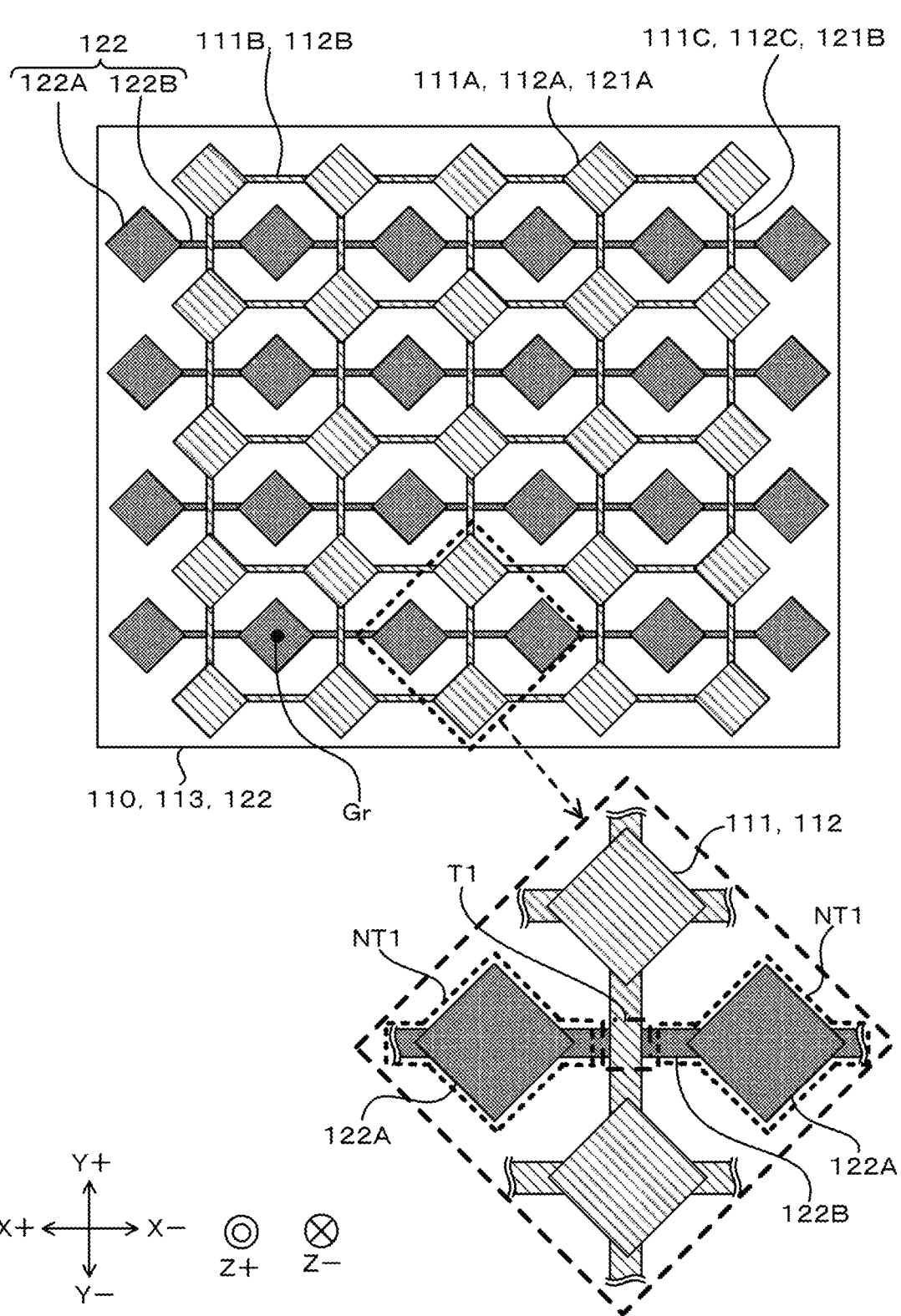
FIG. 6 is a view of a plurality of reception electrodes 121, a plurality of transmission electrodes 122, and a piezoelectric sensor 11 as viewed in the negative direction of the Z axis.
Figure 7:
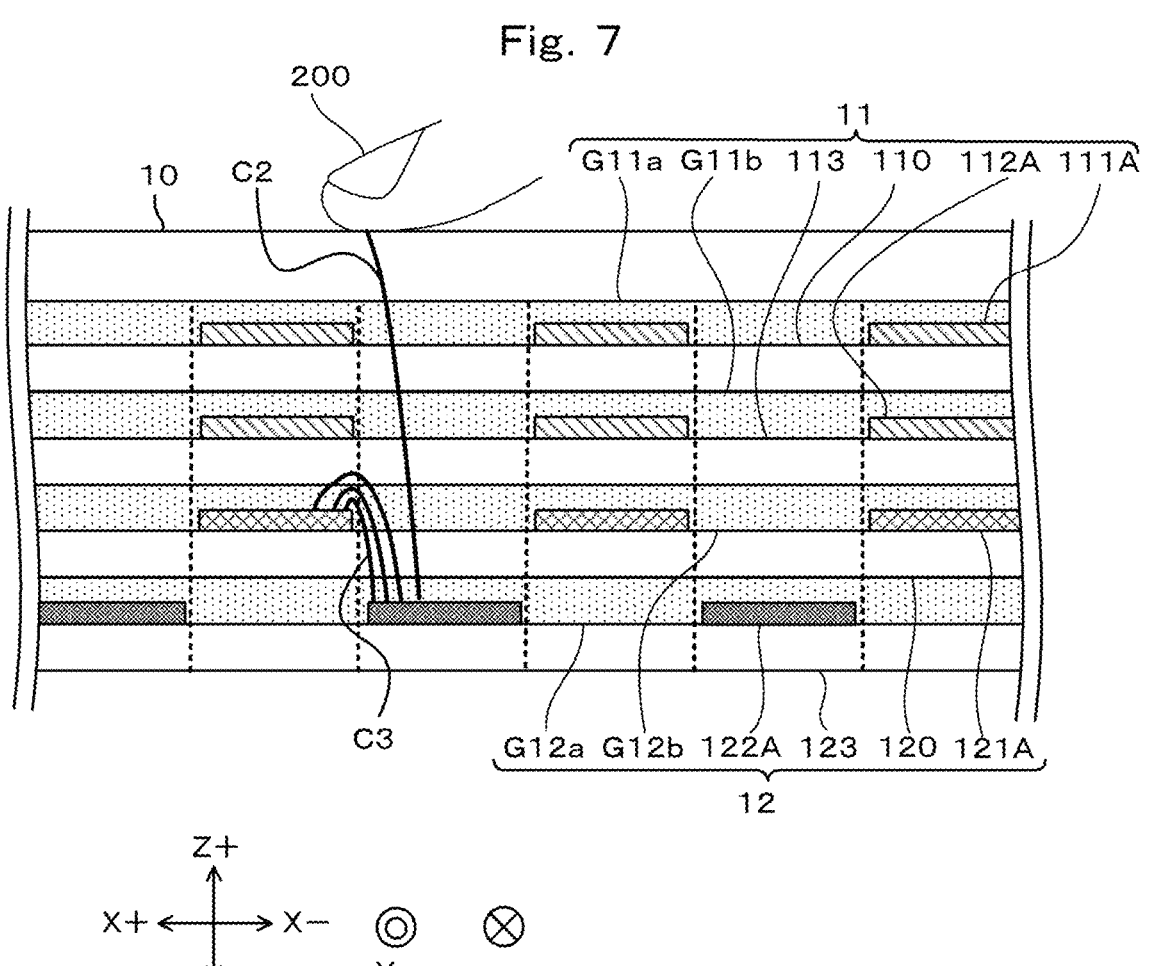
FIG. 7 is a view illustrating a case where a user 200 touches an elastic member 10.

Hereinafter, a sensor module 1 according to a first embodiment of the present disclosure will be described with reference to the drawings. FIG. 1 is an exploded perspective view of the sensor module 1. In FIG. 1, the description of adhesive layers G11a, G11b, G12a, and G12b is omitted. FIG. 2 is a perspective view of the sensor module 1 as viewed in a positive direction of a Y axis. FIG. 3 is a view of the piezoelectric sensor 11 as viewed in a negative direction of a Z axis. FIG. 4 is a view of a piezoelectric film 110 as viewed in the negative direction of the Z axis. FIG. 5 is a view of a touch sensor 12 as viewed in the negative direction of the Z axis. FIG. 6 is a view of a plurality of reception electrodes 121, a plurality of transmission electrodes 122, and a piezoelectric sensor 11 as viewed in the negative direction of the Z axis. FIG. 7 is a view illustrating a case where a user 200 touches an elastic member 10.

In the present embodiment, directions are defined as follows. As illustrated in FIG. 1, the Z axis direction is a direction in which the elastic member 10, the piezoelectric sensor 11, and the touch sensor 12 are arranged. A positive direction of the Z axis is a direction in which the touch sensor 12, the piezoelectric sensor 11, and the elastic member 10 are arranged in this order. The negative direction of the Z axis is a direction in which the elastic member 10, the piezoelectric sensor 11, and the touch sensor 12 are arranged in this order. An X axis direction is a direction orthogonal to the Z axis direction. A Y axis direction is a direction orthogonal to the Z axis direction and the X axis direction.

The sensor module 1 is used in, for example, an electronic device such as a smartphone. As illustrated in FIGS. 1 and 2, the sensor module 1 includes the elastic member 10, the piezoelectric sensor 11, and the touch sensor 12.

The elastic member 10 is formed of, for example, resin. As illustrated in FIG. 1, the elastic member 10 has a plate shape having a long side extending along the X axis and a short side extending along the Y axis. The elastic member 10 has elasticity. The elastic member 10 is deformed by a force applied to the elastic member 10. For example, the user 200 presses the elastic member 10 in the negative direction of the Z axis. The elastic member 10 is deformed by the force which is applied to the elastic member 10 in the negative direction of the Z axis, so as to protrude in the negative direction of the Z axis.

As illustrated in FIGS. 1 and 3, the piezoelectric sensor 11 has a rectangular shape which has a long side extending along the X axis and a short side extending along the Y axis. As illustrated in FIGS. 1 to 3, the piezoelectric sensor 11 includes the piezoelectric film 110, a first electrode 111, a second electrode 112, a first dielectric layer 113, the adhesive layer G11*a*, the adhesive layer G11*b*, and a detection circuit (not illustrated).

As illustrated in FIGS. 1 and 4, the piezoelectric film 110 has a sheet shape which has a long side extending along the X axis and a short side extending along the Y axis. As illustrated in FIGS. 1 and 2, the piezoelectric film 110 includes a piezoelectric film first main surface SF1*a* and a piezoelectric film second main surface SF2*a* arranged along the Z axis. The piezoelectric film first main surface SF1*a* and the piezoelectric film second main surface SF2*a* are arranged in this order in the negative direction of the Z axis.

The piezoelectric film 110 generates a charge according to a deformation amount of the piezoelectric film 110. A polarity of the charge generated when the piezoelectric film 110 is stretched in the X axis direction is opposite to a polarity of the charge generated when the piezoelectric film 110 is stretched in the Y axis direction. Specifically, the piezoelectric film 110 is a film formed of a chiral polymer. The chiral polymer is, for example, polylactic acid (PLA), particularly poly-L-lactic acid (PLLA). A main chain of the PLLA has a helical structure. The PLLA has piezoelectricity in which molecules are oriented when uniaxial stretching is performed. In the present embodiment, a material of the piezoelectric film 110 is polylactic acid. The piezoelectric film 110 has a piezoelectric constant of d14. As illustrated in FIG. 4, a uniaxial stretching direction OD of the piezoelectric film 110 forms an angle of 45 degrees with respect to the X axis direction and the Y axis direction. The 45 degrees include, for example, an angle including about 45 degrees±10 degrees. As a result, the piezoelectric film 110 generates a charge when the piezoelectric film 110 is stretched in the X axis direction or the Y axis direction. The piezoelectric film 110 generates a positive charge when the piezoelectric film 110 is stretched in the X axis direction, for example. The piezoelectric film 110 generates a negative charge when the piezoelectric film 110 is stretched in the Y axis direction, for example. A magnitude of the charge depends on a differential value of the deformation amount of the piezoelectric film 110 due to stretching or compression.

The first electrode 111 is a reference electrode connected to a reference potential. The first electrode 111 is located on the positive side of the Z axis with respect to the piezoelectric film 110. The first electrode 111 is provided on the piezoelectric film first main surface SF1*a*. The first electrode 111 is fixed to the piezoelectric film first main surface SF1*a* by an adhesive (not illustrated) such as an optically clear adhesive (OCA). A material of the first electrode 111 is, for example, indium tin oxide (ITO).

The first electrode 111 includes three types of portions having different shapes. Specifically, as illustrated in FIGS. 1 and 3, the first electrode 111 includes a plurality of first electrode first portions 111A, a plurality of first electrode second portions 111B, and a plurality of first electrode third portions 111C.

In the present embodiment, each of the plurality of first electrode first portions 111A has a square shape as viewed in the Z axis direction. The plurality of first electrode first portions 111A have the same shape as viewed in the Z axis direction. The plurality of first electrode first portions 111A are arranged in a matrix on the piezoelectric film first main surface SF1*a*. Specifically, as illustrated in FIG. 3, a plurality of sets ST of the plurality of first electrode first portions 111A arranged along the X axis are provided on the piezoelectric film first main surface SF1*a*. The plurality of sets are arranged at equal intervals along the Y axis. The plurality of first electrode first portions 111A are not in contact with each other. The plurality of first electrode first portions 111A do not overlap each other as viewed in the Z axis direction.

As illustrated in FIGS. 1 and 3, each of the plurality of first electrode second portions 111B extends along the X axis. A length of each of the plurality of first electrode second portions 111B in the Y axis direction is shorter than a length of each of the plurality of first electrode first portions 111A in the Y axis direction. As illustrated in FIGS. 1 and 3, each of the plurality of first electrode second portions 111B electrically connects two adjacent first electrode first portions 111A of the plurality of first electrode first portions 111A arranged along the X axis.

As illustrated in FIGS. 1 and 3, each of the plurality of first electrode third portions 111C extends along the Y axis. Each of the plurality of first electrode third portions 111C electrically connects two adjacent first electrode first portions 111A of the plurality of first electrode first portions 111A arranged along the Y axis. A length of each of the plurality of first electrode third portions 111C in the X axis direction is shorter than a length of each of the plurality of first electrode first portions 111A in the X axis direction.

As illustrated in FIGS. 1 and 2, the first dielectric layer 113 has a sheet shape which has a long side extending along the X axis and a short side extending along the Y axis. The first dielectric layer 113 is located on the negative side of the Z axis with respect to the piezoelectric film 110. The first dielectric layer 113 includes a first dielectric layer first main surface SF1b and a first dielectric layer second main surface SF2b arranged along the Z axis. The first dielectric layer first main surface SF1b and the first dielectric layer second main surface SF2b are arranged in this order in the negative direction of the Z axis. The first dielectric layer 113 has dielectric properties. A material of the first dielectric layer 113 is polyethylene terephthalate (PET), polyethylene naphthalate (PEN), polypropylene (PP), or the like.

The second electrode 112 is a signal electrode. As illustrated in FIGS. 1 and 2, the second electrode 112 is located on the negative side of the Z axis with respect to the piezoelectric film 110. The second electrode 112 is provided on the first dielectric layer first main surface SF1b. The second electrode 112 is fixed to the first dielectric layer first main surface SF1b by an adhesive (not illustrated) such as OCA. As illustrated in FIGS. 1 and 3, the second electrode 112 overlaps the first electrode 111 as viewed in the Z axis direction. A material of the second electrode 112 is, for example, ITO.

As illustrated in FIGS. 1 and 3, the second electrode 112 includes three types of portions having different shapes, similarly to the first electrode 111. The second electrode 112 includes a plurality of second electrode first portions 112A, a plurality of second electrode second portions 112B, and a plurality of second electrode third portions 112C.

Similarly to the plurality of first electrode first portions 111A, the plurality of second electrode first portions 112A are arranged in a matrix on the first dielectric layer first main surface SF1b (see FIGS. 1 and 3). The plurality of second electrode first portions 112A overlap the plurality of first electrode first portions 111A as viewed in the Z axis direction, respectively. The other configuration of each of the plurality of second electrode first portions 112A is the same as the configuration of the plurality of first electrode first portions 111A, and thus the description thereof will be omitted.

Each of the plurality of second electrode second portions 112B electrically connects two adjacent second electrode first portions 112A of the plurality of second electrode first portions 112A arranged along the X axis. The plurality of second electrode second portions 112B overlap the plurality of first electrode second portions 111B as viewed in the Z axis direction, respectively. The other configuration of each of the plurality of second electrode second portions 112B is the same as the configuration of the plurality of first electrode second portions 111B, and thus the description thereof will be omitted.

Each of the plurality of second electrode third portions 112C electrically connects two adjacent second electrode first portions 112A of the plurality of second electrode first portions 112A arranged along the Y axis. The plurality of second electrode third portions 112C overlap the plurality of first electrode third portions 111C as viewed in the Z axis direction, respectively. The other configuration of each of the plurality of second electrode third portions 112C is the same as the configuration of the plurality of first electrode third portions 111C, and thus the description thereof will be omitted.

As illustrated in FIG. 2, the adhesive layer G11a is located between the elastic member 10 and the piezoelectric film 110. The adhesive layer G11a is located around the first electrode 111. The piezoelectric film 110 is fixed to the elastic member 10 by the adhesive layer G11a.

As illustrated in FIG. 2, the adhesive layer G11b (first adhesive layer) is located between the first dielectric layer 113 and the piezoelectric film 110. The adhesive layer G11b is located around the second electrode 112. The first dielectric layer 113 is fixed to the piezoelectric film 110 by the adhesive layer G11b.

The detection circuit is electrically connected to the first electrode 111 and the second electrode 112. The detection circuit converts the charge generated by the piezoelectric film 110 into a voltage signal. The detection circuit AD-converts the voltage signal to generate a first signal which is a digital signal.

The piezoelectric sensor 11 outputs the first signal corresponding to the deformation of the elastic member 10. As illustrated in FIG. 1, the piezoelectric sensor 11 is fixed to the elastic member 10 by the adhesive layer G11b. As a result, the piezoelectric sensor 11 is deformed along with the deformation of the elastic member 10. The piezoelectric sensor 11 outputs the first signal corresponding to the deformation of the piezoelectric sensor 11. The piezoelectric sensor 11 outputs the first signal on the basis of a potential difference between the first electrode 111 and the second electrode 112.

As illustrated in FIGS. 1 and 5, the touch sensor 12 has a plate shape which has a long side extending along the X axis and a short side extending along the Y axis. Specifically, the touch sensor 12 is a capacitive touch sensor. As illustrated in FIGS. 1, 2, 5, and 6, the touch sensor 12 includes a second dielectric layer 120, a plurality of reception electrodes 121, a plurality of transmission electrodes 122, a third dielectric layer 123, the adhesive layer G12a, the adhesive layer G12b, a transmission circuit 124, and a reception circuit 125.

As illustrated in FIGS. 1 and 5, the second dielectric layer 120 has a sheet shape which has a long side extending along the X axis and a short side extending along the Y axis. As illustrated in FIG. 2, the second dielectric layer 120 is located on the negative side of the Z axis with respect to the first dielectric layer 113. Therefore, the second dielectric layer 120 is located on the negative side of the Z axis with respect to the piezoelectric film 110. The second dielectric layer 120 includes a second dielectric layer first main surface SF1c and a second dielectric layer second main surface SF2c arranged along the Z axis. The second dielectric layer first main surface SF1c and the second dielectric layer second main surface SF2c are arranged in this order in the negative direction of the Z axis. The other configuration of the second dielectric layer 120 is the same as the configuration of the first dielectric layer 113, and thus the description thereof will be omitted.

As illustrated in FIGS. 1 and 2, each of the plurality of reception electrodes 121 is provided on the second dielectric layer first main surface SF1c. Each of the plurality of reception electrodes 121 is fixed to the second dielectric layer first main surface SF1c by an adhesive (not illustrated) such as OCA. As illustrated in FIG. 5, each of the plurality of reception electrodes 121 extends along the Y axis. The plurality of reception electrodes 121 are arranged at equal intervals along the X axis. The plurality of reception electrodes 121 are not in contact with each other. The plurality of reception electrodes 121 do not overlap each other as viewed in the Z axis direction. A material of each of the plurality of reception electrodes 121 is, for example, ITO.

Each of the plurality of reception electrodes 121 includes two types of portions having different shapes. Specifically, each of the plurality of reception electrodes 121 includes a plurality of reception electrode first portions 121A and a plurality of reception electrode second portions 121B.

As illustrated in FIGS. 1 and 5, each of the plurality of reception electrode first portions 121A has a square shape as viewed in the Z axis direction. The plurality of reception electrode first portions 121A have the same shape as viewed in the Z axis direction. Similarly to the plurality of first electrode first portions 111A, the plurality of reception electrode first portions 121A are arranged in a matrix on the second dielectric layer first main surface SF1c. In the present embodiment, the plurality of reception electrode first portions 121A overlap the plurality of first electrode first portions 111A as viewed in the Z axis direction, respectively (see FIGS. 1, 2, and 6).

Each of the plurality of reception electrode second portions 121B extends along the Y axis as illustrated in FIGS. 1 and 5. A width of each of the plurality of reception electrode second portions 121B in the X axis direction is shorter than a width of each of the plurality of reception electrodes 121 in the X axis direction. Each of the plurality of reception electrode second portions 121B electrically connects two adjacent reception electrode first portions 121A of the plurality of reception electrode first portions 121A arranged along the Y axis. In the present embodiment, the plurality of reception electrode second portions 121B overlap the plurality of first electrode second portions 111B and the plurality of second electrode second portions 112B as viewed in the Z axis direction, respectively.

As illustrated in FIG. 2, the third dielectric layer 123 is located on the negative side of the Z axis with respect to the second dielectric layer 120. The third dielectric layer 123 includes a third dielectric layer first main surface SF1d and a third dielectric layer second main surface SF2d arranged along the Z axis. The third dielectric layer first main surface SF1d and the third dielectric layer second main surface SF2d are arranged in this order in the negative direction of the Z axis. The other configuration of the third dielectric layer 123 is the same as the configuration of the second dielectric layer 120, and thus the description thereof will be omitted.

The plurality of transmission electrodes 122 are located on the negative side of the Z axis with respect to the plurality of reception electrodes 121. The plurality of transmission electrodes 122 are provided on the third dielectric layer first main surface SF1d. Each of the plurality of transmission electrodes 122 is fixed to the third dielectric layer first main surface SF1d by an adhesive (not illustrated) such as OCA. As illustrated in FIG. 5, each of the plurality of transmission electrodes 122 extends along the X axis. The plurality of transmission electrodes 122 are arranged at equal intervals in the Y axis direction. The plurality of transmission electrodes 122 is not in contact with each other. The plurality of transmission electrodes 122 do not overlap each other as viewed in the Z axis direction. A material of each of the plurality of transmission electrodes 122 is, for example, ITO.

Each of the plurality of transmission electrodes 122 includes two types of portions having different shapes. Each of the plurality of transmission electrodes 122 includes a plurality of transmission electrode first portions 122A and a plurality of transmission electrode second portions 122B.

As illustrated in FIG. 5, each of the plurality of transmission electrode first portions 122A has a square shape as viewed in the Z axis direction. The plurality of transmission electrode first portions 122A have the same shape as viewed in the Z axis direction. Similarly to the plurality of first electrode first portions 111A, the plurality of transmission electrode first portions 122A are arranged in a matrix on the third dielectric layer 123. In the present embodiment, each of the plurality of transmission electrode first portions 122A does not overlap the first electrode 111 and the second electrode 112 as illustrated in FIG. 6. The plurality of transmission electrode first portions 122A do not overlap the plurality of reception electrodes 121.

Each of the plurality of transmission electrode second portions 122B has a shape extending along the X axis. A length of each of the plurality of transmission electrode second portions 122B in the Y axis direction is shorter than a length of each of the plurality of transmission electrode first portions 122A in the Y axis direction. Each of the plurality of transmission electrode second portions 122B electrically connects two adjacent transmission electrode first portions 122A of the plurality of transmission electrode first portions 122A arranged along the X axis.

In the present embodiment, as illustrated in FIG. 5, parts of the plurality of transmission electrode second portions 122B overlap the plurality of reception electrode second portions 121B as viewed in the Z axis direction, respectively. More specifically, a center of each of the plurality of transmission electrode second portions 122B in the X axis direction and a vicinity thereof overlap with the reception electrode second portion 121B. That is, as illustrated in FIG. 5, the plurality of transmission electrodes 122 include a plurality of first overlapping portions T1 overlapping the plurality of reception electrodes 121 as viewed in the Z axis direction. In addition, the plurality of transmission electrodes 122 include a plurality of first non-overlapping portions NT1 that do not overlap the plurality of reception electrodes 121 as viewed in the Z axis direction. Each of the plurality of first non-overlapping portions NT1 is a portion other than the plurality of first overlapping portions T1 in the plurality of transmission electrodes 122. Therefore, in the example illustrated in FIG. 5, the plurality of first non-overlapping portions NT1 includes the plurality of transmission electrode first portions 122A and both ends of the plurality of transmission electrode second portions 122B in the X axis direction, respectively.

In the present embodiment, as illustrated in FIG. 6, the plurality of first non-overlapping portions NT1 do not overlap the first electrode 111 and the second electrode 112 as viewed in the Z axis direction. Each of the plurality of transmission electrode first portions 122A and both ends of each of the plurality of transmission electrode second portions 122B in the X axis direction do not overlap the first electrode 111 and the second electrode 112 as viewed in the Z axis direction.

In the above configuration, as illustrated in FIG. 6, it is sufficient that a center of gravity Gr of each of at least the plurality of transmission electrode first portions 122A does not overlap the first electrode 111 and the second electrode 112. Therefore, a portion other than the center of gravity Gr in each of the plurality of transmission electrode first portions 122A may overlap the first electrode 111 and the second electrode 112. In the present embodiment, unless otherwise specified, the center of gravity Gr means a center of gravity as viewed in the Z axis direction. Therefore, the center of gravity Gr in the present embodiment is a center of gravity in a two-dimensional plane.

As illustrated in FIG. 2, the adhesive layer G12a is located between the first dielectric layer 113 and the second dielectric layer 120. The second dielectric layer 120 is fixed to the first dielectric layer 113 by the adhesive layer G12a. The adhesive layer G12a is located around the plurality of reception electrodes 121.

As illustrated in FIG. 2, the adhesive layer G12b (second adhesive layer) is located between the second dielectric layer 120 and the third dielectric layer 123. The third dielectric layer 123 is fixed to the second dielectric layer 120 by the adhesive layer G12b. The adhesive layer G12b is located around the plurality of transmission electrodes 122.

The transmission circuit 124 transmits a signal (hereinafter, referred to as a transmission signal) to each of the plurality of transmission electrodes 122. The transmission circuit 124 is, for example, an electric circuit including a multiplexer. The multiplexer sequentially selects the plurality of transmission electrodes 122 one by one. The transmission circuit 124 transmits a transmission signal to one transmission electrode 122 selected by the multiplexer among the plurality of transmission electrodes 122.

The reception circuit 125 receives a signal (hereinafter, referred to as a reception signal) from each of the plurality of reception electrodes 121. The reception circuit 125 is an electric circuit including a multiplexer. The multiplexer sequentially selects the plurality of reception electrodes 121 one by one. The reception circuit 125 receives the reception signal from one reception electrode 121 selected by the multiplexer among the plurality of reception electrodes 121. As a result, the touch sensor 12 outputs a second signal on the basis of a capacitance value of a capacitance generated between the plurality of transmission electrodes 122 and the plurality of reception electrodes 121. The touch sensor 12 transmits the second signal to an arithmetic circuit 13.

The arithmetic circuit 13 specifies a position touched by the user 200 on the elastic member 10, on the basis of the second signal. Specifically, the arithmetic circuit 13 calculates the capacitance value of the capacitance generated between the plurality of transmission electrodes 122 and the plurality of reception electrodes 121, on the basis of the second signal. The arithmetic circuit 13 specifies the position touched by the user 200 on the elastic member 10, on the basis of the calculated capacitance value.

For example, as illustrated in FIG. 2, when the user 200 does not touch the elastic member 10, a capacitance having a capacitance value C1 is generated between one transmission electrode 122 among the plurality of transmission electrodes 122 and one reception electrode 121 among the plurality of reception electrodes 121. Here, as illustrated in FIG. 7, the user 200 touches the elastic member 10. At this time, a capacitance having a capacitance value C2 is generated between the user 200 and one transmission electrode 122 (hereinafter, referred to as a detection transmission electrode) among the plurality of transmission electrodes 122. At this time, due to the capacitance generated between the user 200 and the detection transmission electrode, a capacitance having a capacitance value C3 different from the capacitance value C1 is generated between one reception electrode 121 (hereinafter, referred to as a detection reception electrode) among the plurality of reception electrodes 121 and the detection transmission electrode. The capacitance value C3 is less than the capacitance value C1. At this time, the arithmetic circuit 13 specifies, as the detection transmission electrode, one transmission electrode 122, in which the capacitance having the capacitance value C3 is generated between the transmission electrode 122 and the plurality of reception electrodes 121, among the plurality of transmission electrodes 122. In addition, the arithmetic circuit 13 specifies, as the detection reception electrode, one reception electrode 121, in which the capacitance having the capacitance value C3 is generated between the reception electrode 121 and the plurality of transmission electrodes 122, among the plurality of reception electrodes 121. The arithmetic circuit 13 determines, as the position touched by the user 200 on the elastic member 10, a position at which the detection transmission electrode and the detection reception electrode intersect as viewed in the Z axis direction.

Advantageous Effect

According to the sensor module 1, the piezoelectric sensor 11 can easily detect the deformation of the elastic member 10. Hereinafter, the sensor module 1 and the touch sensor described in Patent Document 1 will be described in comparison with each other. In the touch sensor described in Patent Document 1, each of the first piezoelectric detection electrode and the second piezoelectric detection electrode has an annular shape as viewed in the thickness direction of the touch sensor. Each of the first piezoelectric detection electrode and the second piezoelectric detection electrode is provided at an outer peripheral edge portion of the plate. Here, in the touch sensor described in Patent Document 1, the outer peripheral end of the plate is fixed to the housing. Therefore, the outer peripheral edge portion of the plate is less likely to be deformed than the center of the press detecting sensor and the vicinity thereof. Therefore, when the user presses the outer peripheral edge portion of the plate, it may be difficult for the press detecting sensor to detect deformation of the plate.

On the other hand, in the sensor module 1, a plurality of first electrodes 111 are provided on the entire surface of the elastic member 10. Therefore, regardless of the position where the user 200 presses the elastic member 10, the piezoelectric sensor 11 can easily detect the force applied to the elastic member 10 by the user 200.

In the touch sensor described in Patent Document 1, each of the first piezoelectric detection electrode and the second piezoelectric detection electrode has an annular shape as viewed in the thickness direction of the touch sensor. Each of the first piezoelectric detection electrode and the second piezoelectric detection electrode is provided on the outer peripheral edge portion of the plate as viewed in the thickness direction of the touch sensor. Here, in the field of an electronic device such as a smartphone in which the touch sensor described in Patent Document 1 is used, it is desired to reduce a size of the outer peripheral edge portion of the electronic device (to make the electronic device bezel-less). However, when the touch sensor described in Patent Document 1 is made bezel-less, a size of a portion of the touch sensor where the first piezoelectric detection electrode and the second piezoelectric detection electrode are provided is reduced. Therefore, in the bezel-less touch sensor, there is a possibility that a size of each of the first piezoelectric detection electrode and the second piezoelectric detection electrode decreases. As a result, a sensitivity of the touch sensor may decrease.

On the other hand, in the sensor module 1, a plurality of first electrodes 111 are provided at both the center of the elastic member 10 and the vicinity thereof and the outer peripheral edge portion of the elastic member 10. Therefore, when the electronic device including the sensor module 1 is made bezel-less, the sensitivity of the touch sensor 12 is less likely to decrease as compared with the smartphone including the touch sensor described in Patent Document 1.

Hereinafter, a sensor module (hereinafter, referred to as Comparative Example 1) in which the piezoelectric sensor is located on the negative side of the Z axis with respect to the touch sensor and the sensor module 1 will be described in comparison with each other. In Comparative Example 1, when the user presses the elastic member, the force applied to the elastic member is transmitted to the piezoelectric sensor via the touch sensor. Therefore, in Comparative Example 1, since the piezoelectric sensor is located on the negative side of the Z axis with respect to the touch sensor, a force is less likely to be applied to the piezoelectric sensor.

Therefore, it is difficult for the piezoelectric sensor to detect the deformation of the elastic member.

On the other hand, in the sensor module 1, the piezoelectric sensor 11 is located on the positive side of the Z axis with respect to the touch sensor 12. In this case, as compared with Comparative Example 1, the force applied to the elastic member 10 is easily transmitted to the piezoelectric sensor 11. Therefore, the piezoelectric sensor 11 is likely to be deformed by the force applied to the elastic member 10. As a result, the piezoelectric sensor 11 can easily detect the deformation of the elastic member 10.

In the sensor module 1, the piezoelectric sensor 11 is located on the positive side of the Z axis with respect to the touch sensor 12. In this case, a distance between the plurality of transmission electrodes 122 and the second electrode 112 in the sensor module 1 is longer than a distance between the plurality of transmission electrodes and the first electrodes in Comparative Example 1. Therefore, noise is less likely to be generated in the plurality of transmission electrodes 122 in the sensor module 1, as compared with the plurality of transmission electrodes in Comparative Example 1. Therefore, an area of the plurality of transmission electrodes 122 can be increased. As a result, the sensitivity of the touch sensor 12 is improved.

In the sensor module 1, the plurality of first non-overlapping portions NT1 do not overlap the plurality of reception electrodes 121 as viewed in the Z axis direction. In this case, as illustrated in FIG. 5, an electric field generated by the transmission electrode 122 is less likely to be shielded by the plurality of reception electrodes 121. In addition, the plurality of first non-overlapping portions NT1 do not overlap the first electrode 111 and the second electrode 112. In this case, as illustrated in FIG. 5, the electric field generated by the transmission electrode 122 is less likely to be shielded by the plurality of reception electrodes 121, the first electrode 111, or the second electrode 112. Therefore, a capacitance is easily generated between each of the plurality of transmission electrodes 122 and the user 200. As a result, the arithmetic circuit 13 can easily specify the position touched by the user 200 on the elastic member 10.

In the sensor module 1, the plurality of first non-overlapping portions NT1 do not overlap the first electrode 111 and the second electrode 112. In this case, each of the first electrode 111 and the second electrode 112 is less likely to be affected by the noise generated by the plurality of transmission electrodes 122.

In the sensor module 1, each of the plurality of reception electrodes 121 overlaps the first electrode 111 and the second electrode 112. In this case, a magnetic field generated in the first electrode 111 and the second electrode 112 is easily shielded by the plurality of reception electrodes 121. As a result, each of the plurality of transmission electrodes 122 is less likely to be affected by the noise generated by the first electrode 111 and the second electrode 112.

[Other Configurations of Sensor Module 1]

Hereinafter, other configurations of the sensor module 1 will be described with reference to FIGS. 1 to 7.

The plurality of reception electrodes 121 include a plurality of second non-overlapping portions NT2 that do not overlap the plurality of transmission electrodes 122 as viewed in the Z axis direction (see FIG. 5). The plurality of second non-overlapping portions NT2 do not overlap the plurality of first non-overlapping portions NT1 and the plurality of first overlapping portions T1.

The plurality of reception electrodes 121 includes a plurality of second overlapping portions T2 overlapping the plurality of transmission electrodes 122 as viewed in the Z axis direction. The plurality of second overlapping portions T2 overlap the plurality of first overlapping portions T1, respectively. The plurality of second overlapping portions T2 do not overlap the plurality of first non-overlapping portions NT1, respectively. In the present embodiment, the plurality of reception electrodes 121 overlap the first electrode 111 and the second electrode 112 as viewed in the Z axis direction. Therefore, the plurality of second non-overlapping portions NT2 and the plurality of second overlapping portions T2 overlap the first electrode 111 and the second electrode 112 as viewed in the Z axis direction.

First Modification

Figure 8:
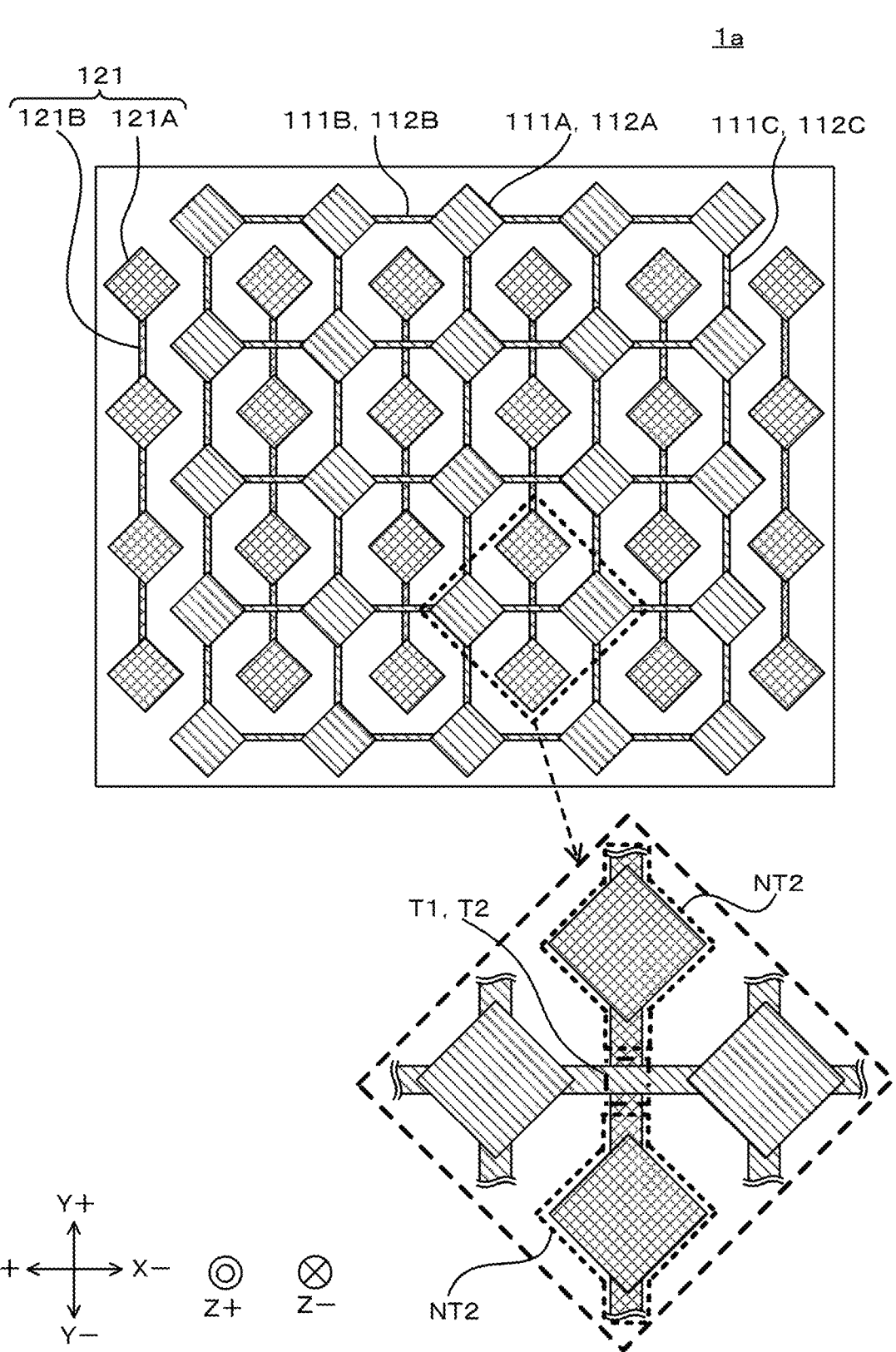
FIG. 8 is a view illustrating a sensor module 1a according to a first modification.
Figure 9:
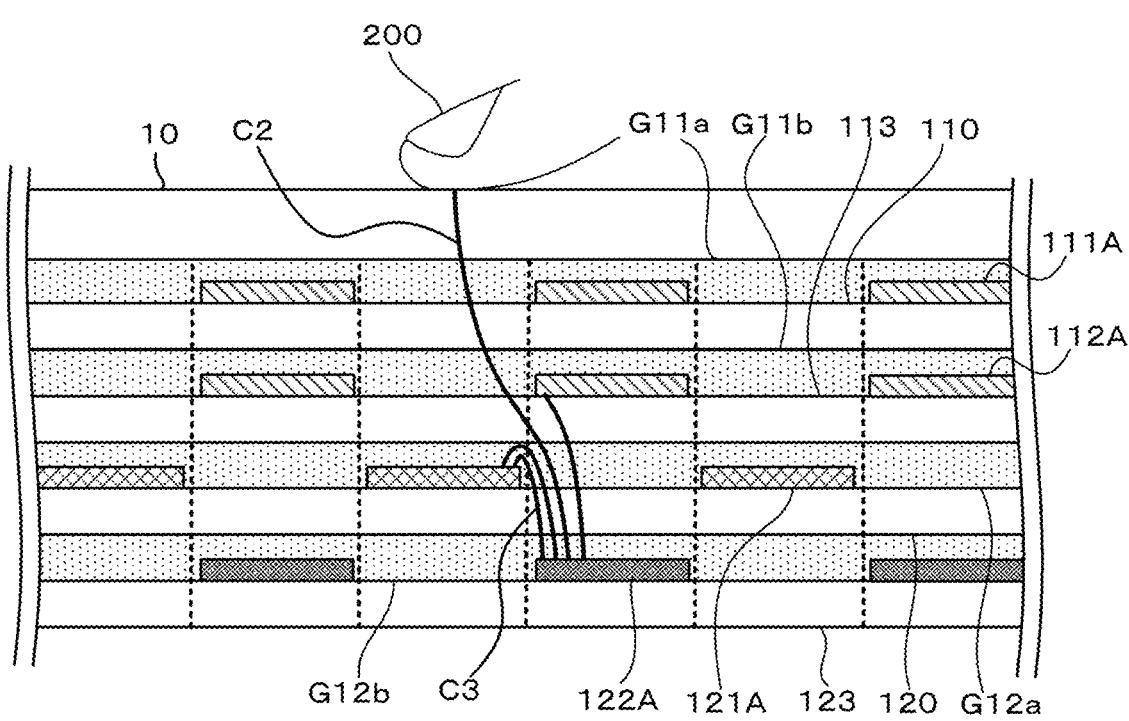

Hereinafter, a sensor module 1a according to a first modification will be described with reference to the drawings. FIG. 8 is a view illustrating the sensor module 1a according to the first modification. FIG. 9 is a view illustrating a case where the user 200 touches the elastic member 10 included in the sensor module 1a.

The sensor module 1a is different from the sensor module 1 in that a part of the plurality of reception electrodes 121 does not overlap the first electrode 111 and the second electrode 112. Specifically, as illustrated in FIG. 8, the plurality of second non-overlapping portions NT2 do not overlap a plurality of first electrodes 111 and a plurality of second electrodes 112 as viewed in the Z axis direction. In the above configuration, similarly to the sensor module 1, the electric field generated by the plurality of transmission electrodes 122 is less likely to be shielded by the plurality of reception electrodes 121 as illustrated in FIG. 9. As a result, the touch sensor 12 in the sensor module 1a can easily specify the position touched by the user 200 on the elastic member 10.

In addition, the sensor module 1a is different from the sensor module 1 in that the plurality of transmission electrodes 122 overlap the first electrode 111 and the second electrode 112. Specifically, the plurality of first overlapping portions T1 overlap the first electrode 111 and the second electrode 112. The plurality of first non-overlapping portions NT1 overlap the first electrode 111 and the second electrode 112.

Similarly to the sensor module 1, in the sensor module 1a, the plurality of transmission electrodes 122 are located on the negative side of the Z axis with respect to the plurality of reception electrodes 121, and the plurality of second electrodes 112 are located on the positive side of the Z axis with respect to the plurality of reception electrodes 121. That is, the plurality of transmission electrodes 122 are not close to the second electrode 112 (see FIG. 9). As a result, the electric field generated by the plurality of transmission electrodes 122 is less likely to be shielded by the second electrode 112.

Such a sensor module 1a has an effect similar to that of the sensor module 1.

Second Modification

Figure 10:
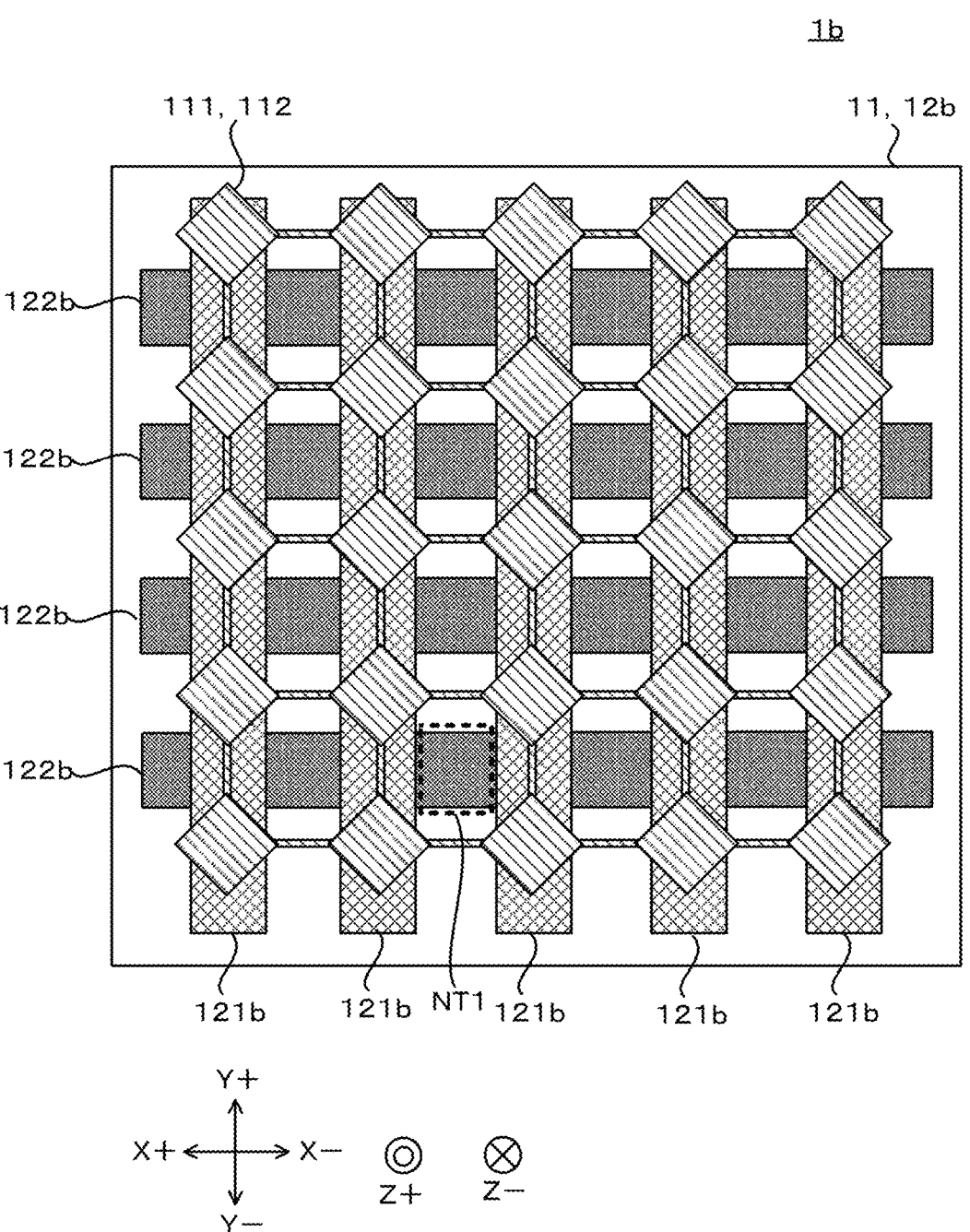
FIG. 10 is a view illustrating a sensor module 1b according to a second modification.

Hereinafter, a sensor module 1b according to a second modification will be described with reference to the drawings. FIG. 10 is a diagram illustrating the sensor module 1b according to the second modification.

The sensor module 1b is different from the sensor module 1 in that the sensor module 1b includes a touch sensor 12b instead of the touch sensor 12. The touch sensor 12b is different from the touch sensor 12 in that the touch sensor 12b includes a plurality of reception electrodes 121b instead of the plurality of reception electrodes 121 and includes a plurality of transmission electrodes 122b instead of the plurality of transmission electrodes 122.

A shape of each of the plurality of reception electrodes 121b is different from the shape of each of the plurality of reception electrodes 121. Each of the plurality of reception electrodes 121b has a rectangular shape extending in the Y axis direction. A width of each of the plurality of reception electrodes 121b in the X axis direction is constant.

A shape of each of the plurality of transmission electrodes 122b is different from the shape of each of the plurality of transmission electrodes 122. Each of the plurality of transmission electrodes 122b has a rectangular shape extending in the X axis direction. A width of each of the plurality of reception electrodes 121b in the Y axis direction is constant. Similarly to the plurality of transmission electrodes 122, each of the plurality of transmission electrodes 122b has the plurality of first non-overlapping portions NT1 (see FIG. 10). As viewed in the Z axis direction, the plurality of first non-overlapping portions NT1 are located between two adjacent reception electrodes 121b among the plurality of reception electrodes 121b. In the present modification, the plurality of first non-overlapping portions NT1 each have a rectangular shape as viewed in the Z axis direction.

Such a sensor module 1b has an effect similar to that of the sensor module 1.

Third Modification

Figure 11:
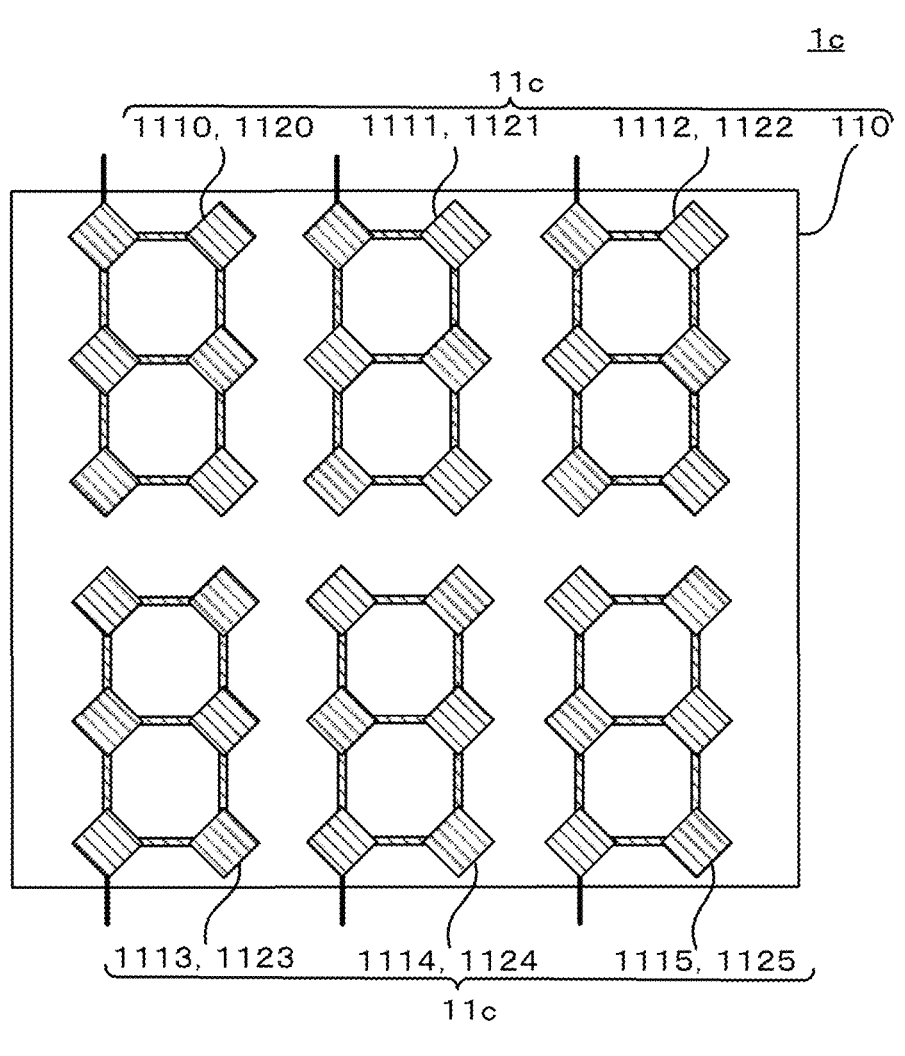
FIG. 11 is a view illustrating a sensor module 1c according to a third modification.
Figure 11:
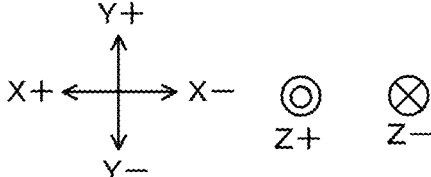

Hereinafter, a sensor module 1c according to a third modification will be described with reference to the drawings. FIG. 11 is a view illustrating the sensor module 1c according to the third modification.

The sensor module 1c is different from the sensor module 1 in that the sensor module 1c includes a piezoelectric sensor 11c instead of the piezoelectric sensor 11. The piezoelectric sensor 11c is different from the piezoelectric sensor 11 in that the piezoelectric sensor 11c includes a plurality of first electrodes 1110 to 1115 and a plurality of second electrodes 1120 to 1125.

The plurality of first electrodes 1110 to 1115 are arranged in a matrix in the piezoelectric film 110. The plurality of first electrodes 1110 to 1115 are not electrically connected to each other. Each of the plurality of first electrodes 1110 to 1115 is electrically connected to the arithmetic circuit 13 by a wiring member.

The plurality of second electrodes 1120 to 1125 are arranged in a matrix in the first dielectric layer 113. The plurality of second electrodes 1120 to 1125 are not electrically connected to each other. Each of the plurality of second electrodes 1120 to 1125 is electrically connected to the arithmetic circuit 13 by a wiring member. The plurality of second electrodes 1120 to 1125 overlap the plurality of first electrodes 1110 to 1115 as viewed in the Z axis direction, respectively.

Since the plurality of first electrodes 1110 to 1115 and the plurality of second electrodes 1120 to 1125 are provided on the piezoelectric film 110, the arithmetic circuit 13 receives a plurality of first signals from the piezoelectric sensor 11c. That is, the output of the piezoelectric sensor 11c is multi-channelized. As a result, the arithmetic circuit 13 can accurately obtain details of an in-plane distribution of the sensitivity of the piezoelectric sensor 11c.

[First Modification of Piezoelectric Sensor 11c]

Figure 12:
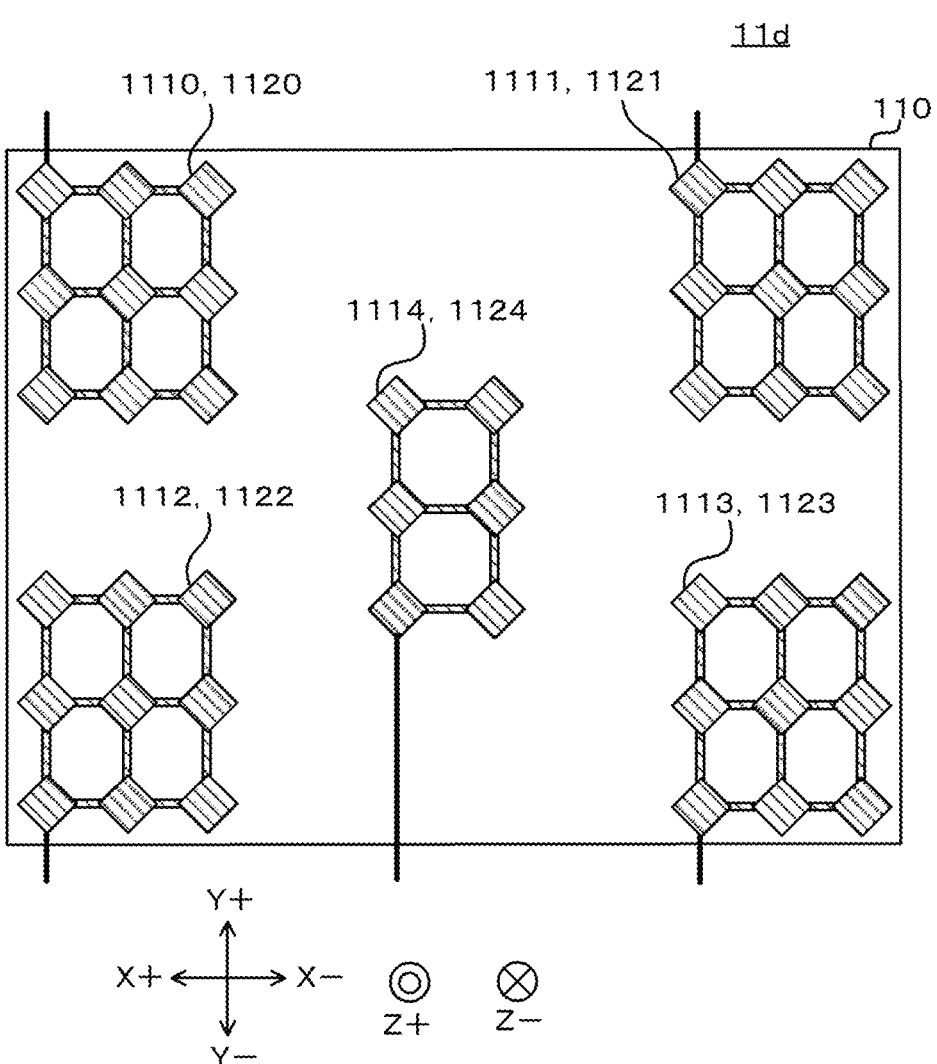
FIG. 12 is a view illustrating a piezoelectric sensor 11d according to a first modification of a piezoelectric sensor 11c.

Hereinafter, a piezoelectric sensor 11d according to a first modification of the piezoelectric sensor 11c will be described with reference to the drawings. FIG. 12 is a view illustrating the piezoelectric sensor 11d according to the first modification of the piezoelectric sensor 11c.

As illustrated in FIG. 12, the piezoelectric sensor 11d includes the plurality of first electrodes 1110 to 1114 and the plurality of second electrodes 1120 to 1124. The first electrode 1110 to the first electrode 1113 and the second electrodes 1120 to 1123 are provided at four corner portions of the piezoelectric film 110 as viewed in the Z axis direction, respectively. The first electrode 1114 and the second electrode 1124 are provided at the center of the piezoelectric film 110 and in the vicinity thereof.

In the present modification, for example, the number of the plurality of first electrode first portions 111A included in the first electrode 1114 is less than the number of the plurality of first electrode first portions 111A included in the first electrode 1110, 1111, 1112, or 1113. In this case, as viewed in the Z axis direction, a size of the first electrode 1114 (first central electrode), which is provided at the center of the piezoelectric film 110, among the plurality of first electrodes 1110 to 1114 is smaller than a size of each of the plurality of first electrodes 1110 to 1113, which are provided around the first electrode 1114 (first central electrode), among the plurality of first electrodes 1110 to 1114. In the present modification, the size of the first electrode 1110 is specifically a size of a region surrounded by the outer peripheral end of the first electrode 1110 as viewed in the Z axis direction. The same applies to the definition of the size of each of the first electrodes 1111 to 1114. In the example illustrated in FIG. 12, the first electrodes 1110 to 1113 are provided near an outer periphery of the piezoelectric film 110 as viewed in the Z axis direction. Therefore, in the example illustrated in FIG. 12, as viewed in the Z axis direction, the size of the first electrode 1114 provided at the center of the piezoelectric film 110 is less than the size of each of the plurality of first electrodes 1110 to 1113 provided near the outer periphery of the piezoelectric film 110.

Similarly, in the present modification, as viewed in the Z axis direction, a size of second electrode 1124 (second central electrode), which is provided at the center of the piezoelectric film 110, among the plurality of the second electrodes 1120 to 1124 is smaller than a size of each of the plurality of second electrodes 1120 to 1123, which are provided around the second electrode 1124 (second central electrode), among the plurality of second electrodes 1120 to 1124.

A vicinity of an outer periphery of the elastic member 10 is less likely to be deformed than the center of the elastic member 10. Here, in the present modification, since the plurality of first electrodes 1110 to 1114 and the plurality of second electrodes 1120 to 1124 are provided near the outer periphery of the piezoelectric film 110, the piezoelectric sensor 11d easily detects deformation in the vicinity of the outer periphery of the elastic member 10. In the present modification, the in-plane distribution of the sensitivity of the piezoelectric sensor 11d can be made uniform by adjusting the size of each of the plurality of first electrodes 1110 to 1115 and the size of each of the plurality of second electrodes 1120 to 1125. That is, the in-plane distribution of the sensitivity of the piezoelectric sensor 11d can be made uniform by adjusting the number of the first electrode first portions 111A included in each of the plurality of first electrodes 1110 to 1115 and the number of the second electrode first portions 112A included in each of the plurality of second electrodes 1120 to 1125.

Note that the in-plane distribution of the sensitivity may be adjusted by adjusting the size of each of the plurality of first electrodes 1110 to 1114. Note that the in-plane distribution of the sensitivity may be adjusted by adjusting the size of each of the plurality of second electrodes 1120 to 1124.

Note that the in-plane distribution of the sensitivity may be adjusted by adjusting the size of each of the plurality of first electrode first portions in the plurality of first electrodes 1110 to 1114. Note that the in-plane distribution of the sensitivity may be adjusted by adjusting the size of each of the plurality of second electrode first portions in the plurality of second electrodes 1120 to 1124.

[Second Modification of Piezoelectric Sensor 11c]

Figure 13:
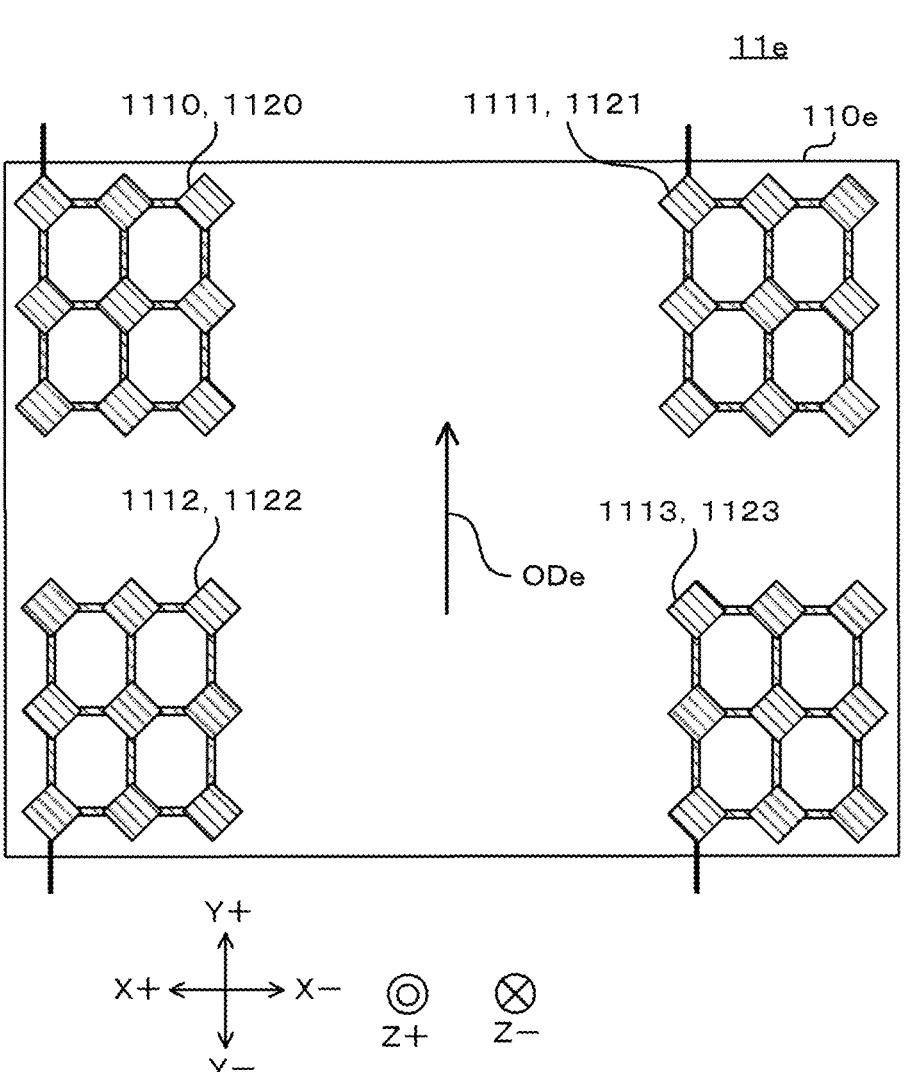
FIG. 13 is a view illustrating a piezoelectric sensor 11e according to a second modification of the piezoelectric sensor 11c.

Hereinafter, a piezoelectric sensor 11e according to a second modification of the piezoelectric sensor 11c will be described with reference to the drawings. FIG. 13 is a view illustrating the piezoelectric sensor 11e according to the second modification of the piezoelectric sensor 11c.

In the present modification, the piezoelectric sensor 11e includes a piezoelectric film 110e instead of the piezoelectric film 110. As illustrated in FIG. 13, a uniaxial stretching direction ODe of the piezoelectric film 110e forms an angle of 0 degrees or 180 degrees with respect to the Y axis direction.

In the present modification, the piezoelectric sensor 11e includes the plurality of first electrodes 1110 to 1113 and the plurality of second electrodes 1120 to 1123. The plurality of first electrodes 1110 to 1113 and the plurality of second electrodes 1120 to 1123 are provided near four corners of the piezoelectric film 110 as viewed in the Z axis direction. In this case, the arithmetic circuit 13 can calculate a magnitude, load, and the like of the force applied to each of the four corner portions of the piezoelectric film 110.

[Touch Panel TP]

Figure 14:
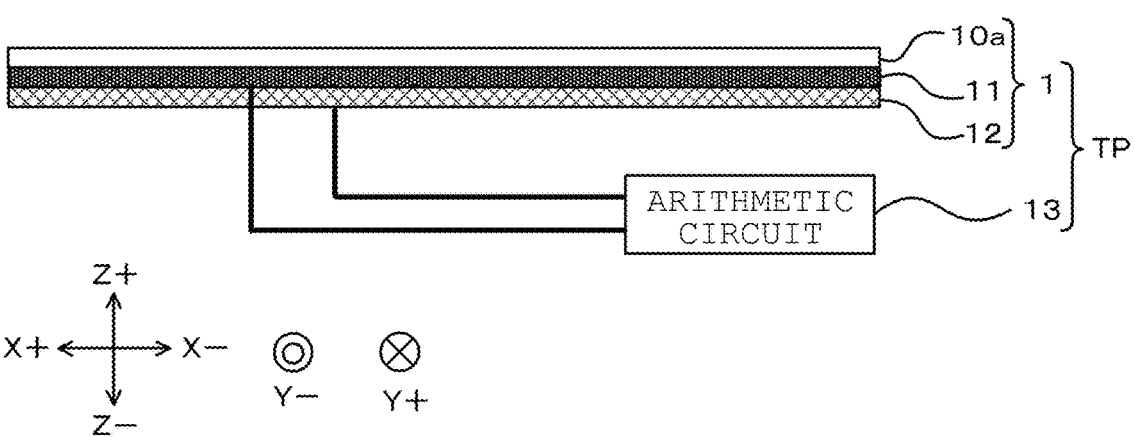
FIG. 14 is a view illustrating a touch panel TP including the sensor module 1.

Hereinafter, a touch panel TP including the sensor module 1 will be described with reference to the drawings. FIG. 14 is a view illustrating the touch panel TP including the sensor module 1.

As illustrated in FIG. 14, the touch panel TP includes the sensor module 1 and the arithmetic circuit 13. The sensor module 1 in the touch panel TP includes the piezoelectric sensor 11, the touch sensor 12, and a front panel 10a. The front panel 10a corresponds to an elastic member in the present application. The configurations of the piezoelectric sensor 11, the touch sensor 12, and the arithmetic circuit 13 in the touch panel TP are the same as the configurations of the piezoelectric sensor 11, the touch sensor 12, and the arithmetic circuit 13 described in the first embodiment, and thus the description thereof will be omitted.

Note that the touch panel TP may include the sensor module 1a to 1c instead of the sensor module 1.

[Example of Electronic Device]

Figure 15:
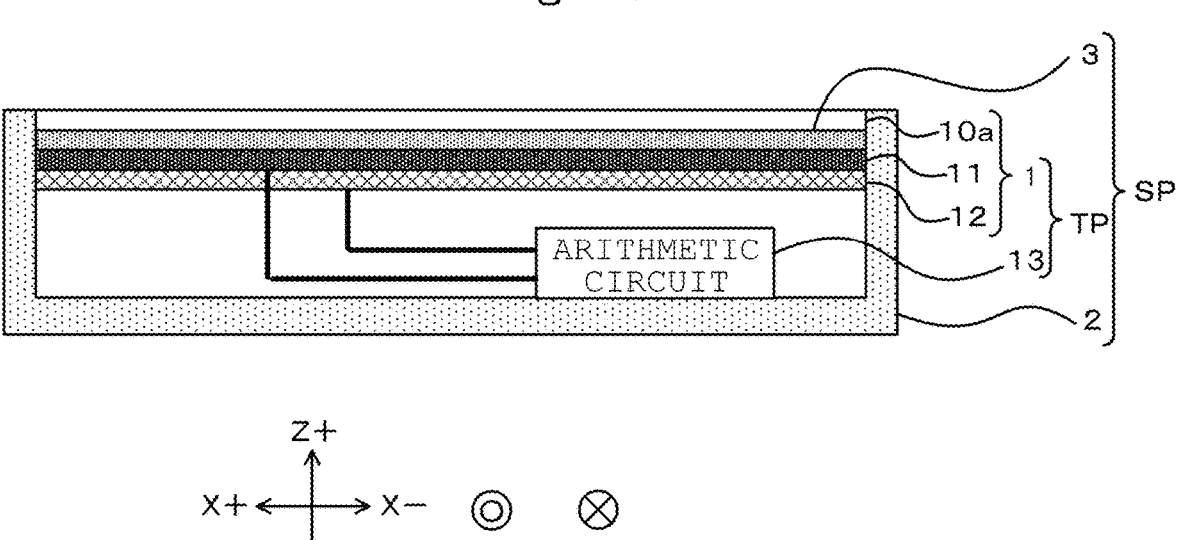
FIG. 15 is a view illustrating a smartphone SP including the touch panel TP.

Hereinafter, a smartphone SP including the touch panel TP will be described with reference to the drawings. FIG. 15 is a view illustrating the smartphone SP including the touch panel TP.

The smartphone SP is an example of the electronic device in the present application. As illustrated in FIG. 15, the smartphone SP includes the touch panel TP, a housing 2, and a display 3. The front panel 10a, the piezoelectric sensor 11, the touch sensor 12, the arithmetic circuit 13, and the display 3 are arranged in the housing 2. The front panel 10a is arranged on the outer peripheral edge portion of the housing 2 so as to close an opening surface of the housing 2. The display 3 is, for example, a liquid crystal display or an organic EL display. The display 3 is arranged, for example, between the front panel 10a and the piezoelectric sensor 11. Note that, in FIG. 15, the arithmetic circuit 13 is arranged on a bottom surface portion of the housing 2, but does not necessarily have to be arranged on the bottom surface portion of the housing 2.

Note that the electronic device in the present application does not necessarily have to be a smartphone, and may be, for example, a tablet computer.

Other Embodiments

The sensor module according to the present disclosure is not limited to the sensor modules 1 and 1a to 1c, and can be modified within the scope of the gist thereof. The configurations of the sensor modules 1 and 1a to 1c may be arbitrarily combined.

Note that each of the plurality of first electrode first portions 111A does not necessarily have to have a square shape as viewed in the Z axis direction. Note that each of the plurality of second electrode first portions 112A does not necessarily have to have a square shape as viewed in the Z axis direction. Note that each of the plurality of reception electrode first portions 121A does not necessarily have to have a square shape as viewed in the Z axis direction. Note that each of the plurality of transmission electrode first portions 122A does not necessarily have to have a square shape as viewed in the Z axis direction.

Note that the piezoelectric sensor 11 does not necessarily have to include the first dielectric layer 113. In this case, each of the plurality of second electrodes 112 is provided on the piezoelectric film second main surface SF2a.

Note that the touch sensor 12 does not necessarily have to include the third dielectric layer 123. In this case, each of the plurality of reception electrodes 121 and each of the plurality of transmission electrodes 122 are provided on the second dielectric layer second main surface SF2c.

Note that in the piezoelectric sensor 11c, the number of the first electrode first portions 111A included in each of the plurality of first electrodes 1110 to 1115 does not necessarily have to be six. Note that in the piezoelectric sensor 11c, the number of the second electrode first portions 112A included in each of the plurality of second electrodes 1120 to 1125 does not necessarily have to be six.

Note that in the piezoelectric sensor 11d or the piezoelectric sensor 11e, the number of the first electrode first portions 111A included in each of the plurality of first electrodes 1110 to 1114 does not necessarily have to be nine. In the piezoelectric sensor 11d, the number of the second electrode first portions 112A included in each of the plurality of second electrodes 1120 to 1124 does not necessarily have to be nine.

Note that in the piezoelectric sensor 11d, the number of the first electrode first portions 111A included in the first electrode 1114 does not necessarily have to be six. In the piezoelectric sensor 11d, the number of the second electrode first portions 112A included in the second electrode 1124 does not necessarily have to be six.

Note that the sensor module 1, 1a to 1c may have a structure in which the plurality of first non-overlapping portions NT1 do not overlap one or more first electrodes 111 and one or more second electrodes 112 as viewed in the Z axis direction, and a structure in which the plurality of second non-overlapping portions NT2 do not overlap one or more first electrodes 111 and one or more second electrodes 112 as viewed in the Z axis direction.

Note that in the sensor module 1c, the plurality of first non-overlapping portions NT1 do not overlap the plurality of first electrodes 1110 to 1115 and the plurality of second electrodes 1120 to 1125 as viewed in the Z axis direction.

The same applies to the sensor module 1c including the piezoelectric sensor 11d or the piezoelectric sensor 11e.

Note that in the sensor module 1c, the plurality of second non-overlapping portions NT2 may not overlap the plurality of first electrodes 1110 to 1115 and the plurality of second electrodes 1120 to 1125 as viewed in the Z axis direction. The same applies to the sensor module 1c including the piezoelectric sensor 11d or the piezoelectric sensor 11e.

The present disclosure has the following structures.

(1) A sensor module including: an elastic member; a piezoelectric sensor which includes a piezoelectric film, one or more first electrodes, and one or more second electrodes; and a touch sensor which includes a plurality of transmission electrodes and a plurality of reception electrodes, in which the elastic member, the piezoelectric sensor, and the touch sensor are arranged in this order in a negative direction of a Z axis, each of the one or more first electrodes are on a positive side of the Z axis with respect to the piezoelectric film, each of the one or more second electrodes are on a negative side of the Z axis with respect to the piezoelectric film, the piezoelectric sensor is constructed to output a first signal when the elastic member is deformed, each of the plurality of transmission electrodes are on the negative side of the Z axis with respect to the plurality of reception electrodes, the touch sensor is constructed to output a second signal on the basis of a capacitance value when a capacitance is generated between the plurality of transmission electrodes and the plurality of reception electrodes, the plurality of transmission electrodes include a plurality of first non-overlapping portions that do not overlap the plurality of reception electrodes as viewed in a Z axis direction, the plurality of reception electrodes include a plurality of second non-overlapping portions that do not overlap the plurality of transmission electrodes as viewed in the Z axis direction, and the plurality of first non-overlapping portions or the plurality of second non-overlapping portions do not overlap the one or more first electrodes and the one or more second electrodes as viewed in the Z axis direction.

(2) The sensor module according to (1), in which the touch sensor further includes a transmission circuit and a reception circuit, the transmission circuit is constructed to transmit a signal to each of the plurality of transmission electrodes, and the reception circuit is constructed to receive signals from the plurality of reception electrodes.

(3) The sensor module according to (1) or (2), in which the piezoelectric film includes a piezoelectric film first main surface and a piezoelectric film second main surface, the piezoelectric film first main surface and the piezoelectric film second main surface are arranged in this order in the negative direction of the Z axis, and each of the one or more first electrodes are on the piezoelectric film first main surface.

(4) The sensor module according to (3), in which each of the one or more second electrodes are on the piezoelectric film second main surface.

(5) The sensor module according to any one of (1) to (3), in which the piezoelectric sensor further includes a first dielectric layer, the first dielectric layer is on the negative side of the Z axis with respect to the piezoelectric film, the first dielectric layer includes a first dielectric layer first main surface and a first dielectric layer second main surface arranged along the Z axis, the first dielectric layer first main surface and the first dielectric layer second main surface are arranged in this order in the negative direction of the Z axis, and each of the plurality of second electrodes are on the first dielectric layer first main surface.

(6) The sensor module according to (5), in which the piezoelectric sensor further includes a first adhesive layer, the first adhesive layer is between the first dielectric layer and the piezoelectric film, and the first dielectric layer is fixed to the piezoelectric film by the first adhesive layer.

(7) The sensor module according to any one of (1) to (6), in which the touch sensor further includes a second dielectric layer, the second dielectric layer is on the negative side of the Z axis with respect to the piezoelectric film, the second dielectric layer includes a second dielectric layer first main surface and a second dielectric layer second main surface arranged along the Z axis, the second dielectric layer first main surface and the second dielectric layer second main surface are arranged in this order in the negative direction of the Z axis, and each of the plurality of reception electrodes are on the second dielectric layer first main surface.

(8) The sensor module according to (7), in which each of the plurality of transmission electrodes are on the second dielectric layer second main surface.

(9) The sensor module according to (7), in which the touch sensor further includes a third dielectric layer, the third dielectric layer is on the negative side of the Z axis with respect to the second dielectric layer, the third dielectric layer includes a third dielectric layer first main surface and a third dielectric layer second main surface arranged along the Z axis, the third dielectric layer first main surface and the third dielectric layer second main surface are arranged in this order in the negative direction of the Z axis, and each of the plurality of transmission electrodes are on the third dielectric layer first main surface.

(10) The sensor module according to (9), in which the touch sensor further includes a second adhesive layer, the second adhesive layer is between the second dielectric layer and the third dielectric layer, and the third dielectric layer is fixed to the second dielectric layer by the second adhesive layer.

(11) The sensor module according to any one of (1) to (10), in which the piezoelectric sensor includes a plurality of the first electrodes and a plurality of the second electrodes, the plurality of first electrodes as viewed in the Z axis direction includes a first central electrode at a center of the piezoelectric film, the plurality of second electrodes as viewed in the Z axis direction includes a second central electrode at the center of the piezoelectric film, as viewed in the Z axis direction and among the plurality of first electrodes, a size of the first central electrode is smaller than a size of each of the plurality of first electrodes around the first central electrode, and as viewed in the Z axis direction and among the plurality of second electrodes, a size of the second central electrode is smaller than a size of each of the plurality of second electrodes around the second central electrode.

(12) The sensor module according to any one of (1) to (11), in which a material of the piezoelectric film is poly-lactic acid.

DESCRIPTION OF REFERENCE SYMBOLS 1, 1a to 1c: Sensor module
10: Elastic member
11, 11c to 11e: Piezoelectric sensor
110, 110e: Piezoelectric film
111, 1110 to 1115: First electrode
112, 1120 to 1125: Second electrode
12, 12b: Touch sensor
121, 121b: Reception electrode 122, 122b: Transmission electrode
NT1: First non-overlapping portion
NT2: Second non-overlapping portion
TP: Touch panel
SP: Smartphone

The invention claimed is:
1. A sensor module comprising:
an elastic member;
a piezoelectric sensor which includes a piezoelectric film, one or more first electrodes, and one or more second electrodes; and
a touch sensor which includes a plurality of transmission electrodes and a plurality of reception electrodes, wherein
the elastic member, the piezoelectric sensor, and the touch sensor are arranged in this order in a negative direction of a Z axis,
each of the one or more first electrodes are on a positive side of the Z axis with respect to the piezoelectric film,
each of the one or more second electrodes are on a negative side of the Z axis with respect to the piezoelectric film,
the piezoelectric sensor is constructed to output a first signal when the elastic member is deformed,
each of the plurality of transmission electrodes are on the negative side of the Z axis with respect to the plurality of reception electrodes,
the touch sensor is constructed to output a second signal on a basis of a capacitance value when a capacitance is generated between the plurality of transmission electrodes and the plurality of reception electrodes,
the plurality of transmission electrodes include a plurality of first non-overlapping portions that do not overlap the plurality of reception electrodes as viewed in a Z axis direction,
the plurality of reception electrodes include a plurality of second non-overlapping portions that do not overlap the plurality of transmission electrodes as viewed in the Z axis direction, and
the plurality of first non-overlapping portions or the plurality of second non-overlapping portions do not overlap the one or more first electrodes and the one or more second electrodes as viewed in the Z axis direction.
2. The sensor module according to claim 1, wherein the plurality of second non-overlapping portions do not overlap the one or more first electrodes and the one or more second electrodes as viewed in the Z axis direction.
3. The sensor module according to claim 1, wherein the plurality of first non-overlapping portions do not overlap the one or more first electrodes and the one or more second electrodes as viewed in the Z axis direction.
4. The sensor module according to claim 1, wherein
the touch sensor further includes a transmission circuit and a reception circuit,
the transmission circuit is constructed to transmit a signal to each of the plurality of transmission electrodes, and
the reception circuit is constructed to receive signals from the plurality of reception electrodes.
5. The sensor module according to claim 1, wherein
the piezoelectric film includes a piezoelectric film first main surface and a piezoelectric film second main surface arranged along the Z axis,
the piezoelectric film first main surface and the piezoelectric film second main surface are arranged in this order in the negative direction of the Z axis, and each of the one or more first electrodes are on the piezoelectric film first main surface.
6. The sensor module according to claim 5, wherein each of the one or more second electrodes are on the piezoelectric film second main surface.
7. The sensor module according to claim 1, wherein
the piezoelectric sensor further includes a first dielectric layer,
the first dielectric layer is on the negative side of the Z axis with respect to the piezoelectric film,
the first dielectric layer includes a first dielectric layer first main surface and a first dielectric layer second main surface arranged along the Z axis,
the first dielectric layer first main surface and the first dielectric layer second main surface are arranged in this order in the negative direction of the Z axis, and
each of the plurality of second electrodes are on the first dielectric layer first main surface.
8. The sensor module according to claim 7, wherein
the piezoelectric sensor further includes a first adhesive layer,
the first adhesive layer is between the first dielectric layer and the piezoelectric film, and
the first dielectric layer is fixed to the piezoelectric film by the first adhesive layer.
9. The sensor module according to claim 1, wherein
the touch sensor further includes a second dielectric layer,
the second dielectric layer is on the negative side of the Z axis with respect to the piezoelectric film,
the second dielectric layer includes a second dielectric layer first main surface and a second dielectric layer second main surface arranged along the Z axis,
the second dielectric layer first main surface and the second dielectric layer second main surface are arranged in this order in the negative direction of the Z axis, and
each of the plurality of reception electrodes are on the second dielectric layer first main surface.
10. The sensor module according to claim 9, wherein each of the plurality of transmission electrodes are on the second dielectric layer second main surface.
11. The sensor module according to claim 9, wherein
the touch sensor further includes a third dielectric layer,
the third dielectric layer is on the negative side of the Z axis with respect to the second dielectric layer,
the third dielectric layer includes a third dielectric layer first main surface and a third dielectric layer second main surface arranged along the Z axis,
the third dielectric layer first main surface and the third dielectric layer second main surface are arranged in this order in the negative direction of the Z axis, and
each of the plurality of transmission electrodes are on the third dielectric layer first main surface.
12. The sensor module according to claim 11, wherein
the touch sensor further includes a second adhesive layer,
the second adhesive layer is between the second dielectric layer and the third dielectric layer, and
the third dielectric layer is fixed to the second dielectric layer by the second adhesive layer.
13. The sensor module according to claim 1, wherein
the piezoelectric sensor includes a plurality of the first electrodes and a plurality of the second electrodes,
the plurality of first electrodes as viewed in the Z axis direction includes a first central electrode at a center of the piezoelectric film, the plurality of second electrodes as viewed in the Z axis direction includes a second central electrode at the center of the piezoelectric film, as viewed in the Z axis direction and among the plurality of first electrodes, a size of the first central electrode is smaller than a size of each of the plurality of first electrodes around the first central electrode, and as viewed in the Z axis direction and among the plurality of second electrodes, a size of the second central electrode is smaller than a size of each of the plurality of second electrodes around the second central electrode.

14. The sensor module according to claim 1, wherein each of the plurality of reception electrodes has a rectangular shape extending in a Y axis direction, and each of the plurality of transmission electrodes has a rectangular shape extending in an X axis direction.

15. The sensor module according to claim 1, wherein the piezoelectric sensor includes a plurality of the first electrodes and a plurality of the second electrodes, the plurality of first electrodes are arranged in a matrix and not electrically connected to each other, and the plurality of second electrodes are arranged in a matrix and not electrically connected to each other.

16. The sensor module according to claim 1, wherein the piezoelectric sensor includes a plurality of the first electrodes and a plurality of the second electrodes in corners of the piezoelectric film as viewed in the Z axis direction, and a uniaxial stretching direction of the piezoelectric film forms an angle of 0 degrees or 180 degrees with respect to a Y axis direction.

17. The sensor module according to claim 1, wherein a material of the piezoelectric film is polylactic acid.

18. A touch panel comprising the sensor module according to claim 1.

19. An electronic device comprising:

the touch panel according to claim 18.

\* \* \* \* \*